US00RE48976E

(19) United States
(12) Reissued Patent
Peery

(10) Patent Number: US RE48,976 E
(45) Date of Reissued Patent: Mar. 22, 2022

(54) TABLE WITH MOLDED PLASTIC TABLE TOP

(71) Applicant: LIFETIME PRODUCTS, INC., Clearfield, UT (US)

(72) Inventor: Wendell Peery, Kaysville, UT (US)

(73) Assignee: LIFETIME PRODUCTS, INC., Clearfield, UT (US)

(21) Appl. No.: 16/542,256

(22) Filed: Aug. 15, 2019

Related U.S. Patent Documents

Reissue of:
(64) Patent No.: 9,730,514
Issued: Aug. 15, 2017
Appl. No.: 14/854,999
Filed: Sep. 15, 2015

U.S. Applications:
(63) Continuation of application No. 13/455,076, filed on Apr. 24, 2012, now Pat. No. 9,138,050, which is a (Continued)

(51) Int. Cl.
*A47B 3/00* (2006.01)
*A47B 7/02* (2006.01)

(Continued)

(52) U.S. Cl.
CPC ..... *A47B 87/02* (2013.01); *A47B 3/091* (2013.01); *A47B 3/0912* (2013.01); *A47B 7/02* (2013.01); *A47B 13/083* (2013.01)

(58) Field of Classification Search
CPC ..... A47B 7/02; A47B 3/0912; A47B 3/091; A47B 3/087; A47B 13/083; A47B 13/003;

(Continued)

(56) References Cited

U.S. PATENT DOCUMENTS 1,593,975 A 7/1926 Karstens
1,856,935 A 5/1932 Turner (Continued)

FOREIGN PATENT DOCUMENTS

CN 2528283 1/2003
CN 2556996 6/2003

(Continued)

OTHER PUBLICATIONS

U.S. Appl. No. 61/478,786, filed Apr. 25, 2011, Winter, et al.

(Continued)

*Primary Examiner* — Patricia L Engle
(74) *Attorney, Agent, or Firm* — Maschoff Brennan

(57) ABSTRACT

A table may be sized and configured to nest with an adjacent table to reduce a height of a plurality of stacked tables in a nested configuration. The tabletop may include an upper surface, a sidewall and a receiving portion at least partially disposed in the upper surface and the sidewall. The receiving portion may be sized and configured to receive an engaging portion of an adjacent table when the tables are disposed in a nested configuration. The tabletop may also include a plurality of strengthen members disposed in the lower portion of the tabletop that are sized and configured to support the receiving portion. For example, the strengthening members may include an inner surface sized and configured to support an inner surface of the receiving portion.

25 Claims, 18 Drawing Sheets

Related U.S. Application Data continuation of application No. 29/390,471, filed on Apr. 25, 2011, now Pat. No. Des. 659,450.

(60) Provisional application No. 61/543,277, filed on Oct. 4, 2011, provisional application No. 61/531,081, filed on Sep. 5, 2011, provisional application No. 61/478,786, filed on Apr. 25, 2011, provisional application No. 61/478,879, filed on Apr. 25, 2011.

(51) Int. Cl.
*A47B 3/091* (2006.01)
*A47B 87/02* (2006.01)
*A47B 13/08* (2006.01)

(58) Field of Classification Search
CPC ..... A47B 87/02; A47B 87/0246; B29L 2031/448
See application file for complete search history.

(56) References Cited

U.S. PATENT DOCUMENTS

| | | | | |
|---|---|---|---|---|
| 2,540,849 | A | 2/1951 | Walker | A47B 3/0915 108/91 |
| 2,889,185 | A | 6/1959 | Heisler | |
| 3,389,511 | A | 6/1968 | Drehobl | |
| 3,917,108 | A | 11/1975 | Thurman | |
| 4,570,993 | A | 2/1986 | Widerker | |
| 4,841,877 | A | 6/1989 | Virtue | |
| 5,009,170 | A | 4/1991 | Spehar | |
| 5,381,740 | A | 1/1995 | Johnston | |
| 5,421,272 | A | 6/1995 | Wilmore | |
| 5,505,142 | A | 4/1996 | Fink | |
| 5,664,934 | A | 9/1997 | Schaede et al. | |
| 5,775,655 | A | 7/1998 | Schmeets | |
| 5,960,720 | A | 10/1999 | Borland et al. | |
| 5,983,807 | A | 11/1999 | Tarnay | |
| 6,058,853 | A | 5/2000 | Pinch | |
| 6,112,674 | A | 9/2000 | Stanford | |
| 6,199,487 | B1 | 3/2001 | Coddington | |
| 6,394,004 | B1 | 5/2002 | Lynn | |
| D468,135 | S * | 1/2003 | Ashby | D6/707.26 |
| D487,205 | S * | 3/2004 | Mower | D6/707.26 |
| 6,722,293 | B2 | 4/2004 | Lee | |
| 6,732,663 | B2 | 5/2004 | Tsai | |
| 6,752,091 | B2 | 6/2004 | Glover et al. | |
| 6,772,700 | B2 | 8/2004 | Wong | |
| 7,069,865 | B2 | 7/2006 | Strong et al. | |
| 7,073,450 | B2 | 7/2006 | Tsai | |
| 7,096,800 | B2 | 8/2006 | Stanford | |
| 7,100,518 | B2 | 9/2006 | Strong | |
| 7,111,563 | B2 | 9/2006 | Strong | |
| 7,150,237 | B2 | 12/2006 | Lin et al. | |
| 7,171,910 | B2 | 2/2007 | Neunzert et al. | |
| 7,278,361 | B2 | 10/2007 | Zhurong et al. | |
| 7,428,872 | B2 | 9/2008 | Strong et al. | |
| 7,634,969 | B2 | 12/2009 | Neunzert et al. | |
| 7,634,970 | B2 | 12/2009 | Strong et al. | |
| 7,640,870 | B2 | 1/2010 | Strong et al. | |
| 7,707,947 | B2 | 5/2010 | Winter et al. | |
| 7,752,982 | B2 | 7/2010 | Lin | |
| 7,799,482 | B2 | 9/2010 | Cho et al. | |
| 7,905,185 | B2 | 3/2011 | Peery et al. | |
| 8,006,630 | B2 | 8/2011 | Strong et al. | |
| 8,033,228 | B2 | 10/2011 | Haney | |
| 8,042,475 | B2 | 10/2011 | Larcom et al. | |
| 8,042,476 | B2 | 10/2011 | Stanford | |
| 8,074,582 | B2 | 12/2011 | Stanford | |
| 8,091,289 | B2 | 1/2012 | Mower et al. | |
| 8,161,711 | B2 | 4/2012 | Steed et al. | |
| D658,912 | S | 5/2012 | Winter et al. | |
| D659,450 | S | 5/2012 | Winter et al. | |
| D662,738 | S | 7/2012 | Winter et al. | |
| D667,659 | S | 9/2012 | Winter et al. | |
| 8,267,018 | B2 | 9/2012 | Gunn | |
| 8,347,795 | B2 | 1/2013 | Peery et al. | |
| 8,397,652 | B2 | 3/2013 | Peery et al. | |
| 8,408,146 | B2 | 4/2013 | Peery et al. | |
| 8,555,789 | B2 | 10/2013 | Jin et al. | |
| 8,578,863 | B2 | 11/2013 | Peery et al. | |
| 8,622,007 | B2 | 1/2014 | Peery et al. | |
| 8,683,929 | B2 | 4/2014 | Peery et al. | |
| 8,757,069 | B2 | 6/2014 | Peery et al. | |
| 8,857,349 | B2 | 10/2014 | Peery et al. | |
| 8,943,982 | B2 | 2/2015 | Peery et al. | |
| 8,997,663 | B2 | 4/2015 | Peery et al. | |
| 9,138,050 | B2 | 9/2015 | Peery | |
| 9,730,514 | B2 | 8/2017 | Peery | |
| 2003/0167981 | A1 | 9/2003 | Cai et al. | |
| 2003/0217676 | A1 | 11/2003 | Strong et al. | |
| 2003/0221595 | A1 | 12/2003 | Reinsch et al. | A47B 3/0912 108/91 |
| 2003/0233968 | A1 | 12/2003 | Strong et al. | |
| 2004/0031422 | A1 | 2/2004 | Wong | |
| 2005/0005826 | A1 | 1/2005 | Strong et al. | A63B 63/083 108/132 |
| 2005/0045074 | A1 | 3/2005 | Jin | |
| 2005/0098068 | A1 | 5/2005 | Tsai | |
| 2005/0155531 | A1 | 7/2005 | Chang | |
| 2005/0268827 | A1 | 12/2005 | Stanford | |
| 2006/0019776 | A1 | 1/2006 | Mower | |
| 2006/0230989 | A1 | 10/2006 | Haney et al. | |
| 2006/0236902 | A1* | 10/2006 | Haney | A47B 13/08 108/57.16 |
| 2007/0101910 | A1 | 5/2007 | Halmoff et al. | |
| 2007/0199483 | A1 | 8/2007 | Peery et al. | A47B 3/0912 108/132 |
| 2007/0272128 | A1 | 11/2007 | Lin | |
| 2008/0060563 | A1 | 3/2008 | Yang | |
| 2008/0264307 | A1 | 10/2008 | Van Nimwegen | |
| 2009/0114131 | A1 | 5/2009 | Haney et al. | |
| 2012/0266790 | A1 | 10/2012 | Peery et al. | |
| 2014/0037910 | A1* | 2/2014 | Leng | A47B 13/08 428/172 |

FOREIGN PATENT DOCUMENTS

| | | |
|---|---|---|
| CN | 1627908 | 6/2005 |
| CN | 201265212 | 7/2009 |
| CN | 101557732 | 10/2009 |
| CN | 202739180 | 2/2013 |
| CN | 202820137 | 3/2013 |
| DE | 102007041234 | 3/2009 |

OTHER PUBLICATIONS

U.S. Appl. No. 61/478,879, filed Apr. 25, 2011, Johnson, et al.
U.S. Appl. No. 61/531,081, filed Sep. 5, 2011, Winter, et al.
U.S. Appl. No. 61/543,277, filed Oct. 4, 2011, Winter, et al.
U.S. Appl. No. 13/455,041, filed Apr. 24, 2012, Peery, et al.
U.S. Appl. No. 13/455,055, filed Apr. 24, 2012, Peery, et al.
U.S. Appl. No. 13/455,066, filed Apr. 24, 2012, Peery, et al.
U.S. Appl. No. 13/455,073, filed Apr. 24, 2012, Peery, et al.
U.S. Appl. No. 13/455,081, filed Apr. 24, 2012, Peery, et al.
U.S. Appl. No. 13/559,062, filed Jul. 26, 2012, Jin, et al.
U.S. Appl. No. 13/592,230, filed Aug. 22, 2012, Peery, et al.
U.S. Appl. No. 13/604,557, filed Sep. 5, 2012, Peery, et al.
U.S. Appl. No. 13/735,913, filed Jan. 7, 2013, Peery, et al.
U.S. Appl. No. 13/846,648, filed Mar. 18, 2013, Peery, et al.
U.S. Appl. No. 14/077,147, filed Nov. 11, 2013, Peery, et al.
U.S. Appl. No. 14/231,283, filed Mar. 31, 2014, Peery, et al.
U.S. Appl. No. 14/312,396, filed Jun. 23, 2014, Peery, et al.
U.S. Appl. No. 14/053,554, filed Oct. 14, 2013, Jin, et al.
U.S. Appl. No. 14/513,082, filed Oct. 13, 2014, Peery, et al.
U.S. Appl. No. 14/612,092, filed Feb. 2, 2015, Peery, et al.
Office Action from U.S. Appl. No. 13/455,041 dated Jun. 27, 2012.
Office Action from U.S. Appl. No. 13/455,055 dated Jun. 27, 2012.
International Search Report and Written Opinion from PCT/US2012/035054 dated Jul. 17, 2012.

(56) References Cited

OTHER PUBLICATIONS

International Search Report and Written Opinion from PCT/US2012/035058 dated Jul. 13, 2012.
International Search Report and Written Opinion from PCT/US2012/035055 dated Jul. 17, 2012.
International Search Report and Written Opinion from PCT/US2012/035056 dated Jul. 17, 2012.
International Search Report and Written Opinion from PCT/US2012/035059 dated Jul. 17, 2012.
International Search Report and Written Opinion from PCT/US2012/035061 dated Jul. 17, 2012.
Office Action from U.S. Appl. No. 13/592,230 dated Nov. 6, 2012.
Office Action from U.S. Appl. No. 13/559,062 dated Dec. 19, 2012.
Office Action from U.S. Appl. No. 13/604,557 dated Dec. 20, 2012.
Notice of Allowance from U.S. Appl. No. 13/455,041 dated Oct. 23, 2012.
Notice of Allowance from U.S. Appl. No. 13/455,055 dated Oct. 17, 2012.
European Search Report from EPO Application No. EP12183082 dated Nov. 20, 2012.
International Search Report and Written Opinion from PCT/US2012/048485 dated Oct. 15, 2012.
Office Action from U.S. Appl. No. 13/455,081 dated Sep. 11, 2012.
Notice of Allowance from U.S. Appl. No. 13/455,066 dated Sep. 10, 2012.
Office Action from U.S. Appl. No. 13/455,073 dated Feb. 28, 2013.
Notice of Allowance from U.S. Appl. No. 13/559,062 dated Jun. 12, 2013.
Notice of Allowance from U.S. Appl. No. 13/604,557 dated Jul. 12, 2013.
Notice of Allowance from U.S. Appl. No. 13/604,557 dated Jul. 30, 2013.
Office Action from U.S. Appl. No. 13/735,913 dated Nov. 29, 2013.
Office Action from U.S. Appl. No. 14/077,147 dated Mar. 17, 2014.
Notice of Allowance from U.S. Appl. No. 13/846,648 dated Feb. 26, 2014.
European Search Report from EPO Application No. EP12777035 dated Jul. 10, 2014.
European Search Report from EPO Application No. EP12777332 dated Jul. 10, 2014.
Office Action from U.S. Appl. No. 13/735,913 dated Jul. 10, 2014.
Office Action from U.S. Appl. No. 14/231,283 dated May 19, 2014.
European Search Report from EPO Application No. EP12776938 dated Jul. 10, 2014.
Office Action from U.S. Appl. No. 14/077,147 dated Sep. 3, 2014.
Examination Report from Australian Appl. No. 2012249776 dated Feb. 9, 2015.
Examination Report from Australian Appl. No. 20122249780 dated Mar. 10, 2015.
Office Action from Canadian Appl. No. 2819028 dated Aug. 15, 2014.
Supplemental European Search Report from EPO Appl. No. 12776938.8 dated Aug. 5, 2014.
Office Action from U.S. Appl. No. 14/612,092 dated Mar. 20, 2015.
Office Action from U.S. Appl. No. 13/455,076 dated May 12, 2014.
Notice of Allowance from Australian Patent Application No. 2012249780 dated Mar. 31, 2016.
Examiner's Report from European Patent Application No. 12776938.8 dated Jun. 28, 2016.

* cited by examiner

TABLE WITH MOLDED PLASTIC TABLE TOP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. patent application Ser. No. 13/455,076, filed Apr. 24, 2012, now U.S. Pat. No. 9,138,050, issued Sep. 22, 2015; which claims priority to and the benefit of U.S. Provisional Patent Application Ser. No. 61/478,786, entitled TABLE, filed on Apr. 25, 2011; U.S. Provisional Patent Application Ser. No. 61/478,879, entitled TABLES AND CHAIRS, filed on Apr. 25, 2011; U.S. Design Patent Application Ser. No. 29/390,471, entitled PORTION OF A TABLETOP, filed on Apr. 25, 2011, now U.S. Pat. No. D659,450, issued May 15, 2012; U.S. Provisional Patent Application Ser. No. 61/531,081, entitled TABLE, filed on Sep. 5, 2011; and U.S. Provisional Patent Application Ser. No. 61/543,277, entitled TABLE, filed on Oct. 4, 2011; each of these applications and patents is incorporated by reference in its entirety.

BACKGROUND

Field of the Invention

The present invention generally relates to structures including at least a portion constructed from plastic and, in particular, to furniture, such as tables and chairs, that may include molded plastic components.

Description of Related Art

Many different types of tables are well known and used for a variety of different purposes. For example, conventional tables may include legs that are pivotally attached to a tabletop and the legs may be movable between a use position in which the legs extend outwardly from the tabletop and a storage position in which the legs are folded against the tabletop. Conventional tables with relatively large tabletops and folding legs are often referred to as "banquet tables" and these tables are frequently used in assembly halls, banquet halls, convention centers, hotels, schools, churches and other locations where large groups of people meet. These types of tables can often be positioned in an assortment of different configurations and used in a variety of settings. When the banquet tables are no longer needed, the table legs can be moved into the storage position and the tables may be more easily moved or stored.

Because most banquet tables have a length between six and ten feet and a width between three and four feet, the required storage area for such tables is quite large even with the legs in the collapsed position. This large storage area may be problematic for businesses or facilities such as hotels, schools and churches because a considerable number of these tables may have to be stored.

Conventional tables often include tabletops constructed from materials such as wood, particle board or metal. Tabletops constructed from wood, particle board or metal, however, are often relatively heavy and this may make the table awkward or difficult to move. Tabletops constructed from wood or metal are also relatively expensive and these types of tabletops must generally be treated or finished before use. For example, tabletops constructed from wood must generally be sanded and painted, and metal tabletops must be formed into the desired shape and painted. In addition, because these wooden and metal tabletops are relatively heavy, the cost of shipping and transportation of the tables may be increased. The weight of the tabletop may make the tables more difficult to move and store.

In order to decrease the weight of conventional tables, tabletops may be constructed from relatively light-weight materials such as plastic. Disadvantageously, tabletops constructed from light-weight materials may require large reinforcing members or other structural parts such as braces, brackets, support members and the like to strengthen the tabletop. While these additional parts may increase the strength of the tabletop, the added parts may also increase the weight of the table. These additional parts may result in increased manufacturing costs and require additional time to assemble the table. In addition, extra fasteners may be required to assemble and connect these parts to the table, which may require extra time and labor during the manufacturing process. The additional parts and fasteners may further increase the cost of the table and make the table more difficult to manufacture. Moreover, these additional parts and fasteners may have sharp edges that can injure a user's legs or arms.

Conventional tables may include a frame that is connected to the tabletop. The frame may include a pair of side rails connected to sides of the tabletop using fasteners. Multiple fasteners may be required to securely connect the frame to the tabletop and transmit forces applied to the tabletop to the frame. Undesirably, when a relatively large load or force is applied to some known tables, the frame may bend, deform and/or detach from the tabletop. In addition, the fasteners used to connect the frame to the tabletop may detach or separate from the tabletop. The fasteners may even damage and tear through the tabletop if the load or force exceeds a certain amount. Further, the frames or fasteners of some known tables may collapse in some circumstances.

The tabletop of some known tables may undesirably bend or deform if a relatively large load or force is applied to a portion of the tabletop. For instance, if the load or force is applied to an outer portion of a conventional tabletop, that portion of the tabletop may undesirably move or bend. In particular, that portion of the tabletop may deflect downward when the load or force is applied to the upper surface of the tabletop.

The large size of conventional banquet tables may require a large amount of storage space for manufacturers, retailers and consumers. The large amount of storage space may be particularly problematic for manufacturers, retailers and consumers that have a need to store, transport and/or display large numbers of tables.

BRIEF SUMMARY

A need therefore exists for a table that eliminates or diminishes the above-described disadvantages and problems.

One aspect is a table that may include a tabletop and one or more legs sized and configured to support the tabletop above a surface such as the floor or ground. The table may also include a frame and legs connected to the frame. The legs may be movable relative to the tabletop between a collapsed or storage position and an extended or use position. In particular, the legs may be pivoted between a collapsed position in which the legs are disposed at least proximate a lower surface of the tabletop and an extended position in which the legs extend outwardly from the tabletop. If desired, the legs may at least partially contact or abut the lower surface of the tabletop when the legs are in the collapsed position. In addition, the lower surface of the tabletop may include one or more recesses sized and configured to receive at least a portion of the legs when the legs are in the collapsed position. Advantageously, this may decrease the amount of space required to store and/or transport the table.

Another aspect is a table that may be relatively lightweight, which may allow the table to be more easily transported and moved. For example, the table may include a lightweight tabletop and that may reduce the overall weight of the table. The table may also be constructed from a limited number of parts or components, which may allow the weight of the table to be reduced. Further, a limited number of fasteners may be required to assemble the table, which may also reduce the weight of the table. The limited number of fasteners may also allow the table to be quickly and easily assembled.

Yet another aspect is a table that may include a tabletop constructed from plastic. For example, the tabletop may be constructed from molded plastic using blow-molding, injection molding, rotary molding or other suitable molding processes. The molded plastic tabletop may provide a relatively rigid, high-strength structure capable of withstanding repeated use and wear. The molded plastic tabletop may also be relatively quickly, easily and efficiently manufactured. In addition, the molded plastic tabletop may be readily molded into a desired size and shape, such as a utility table, card table, personal table and the like. The molded plastic tabletop may be relatively lightweight because, for instance, it may include a hollow interior portion formed during the molding process. The molded plastic tabletop may further include two opposing walls, which may be spaced apart by a generally constant and/or predetermined distance, and that may help increase the strength and rigidity of the tabletop. Additionally, the molded plastic tabletop may be generally weather resistant and temperature insensitive. Further, the molded plastic tabletop may not corrode, rust or otherwise deteriorate over an extended period of time, which may help create a long-lasting table.

Still another aspect is a tabletop that may be constructed from molded plastic and one or more features may be integrally formed during the molding process as part of a unitary, one-piece construction. For example, the molded plastic tabletop may include one or more depressions (also referred to as "tack-offs") and the depressions may be designed and positioned to increase the strength of the tabletop and/or interconnect spaced apart walls of the tabletop. The depressions may also be sized and configured to create a structure with particular characteristics and qualities, such as a tabletop with generally uniform strength, rigidity and/or structural integrity. The molded plastic tabletop may also include other features such as structures that increase the strength, rigidity and/or torsion resistance of at least a portion of the tabletop.

Still yet another aspect is a table that may include components that can be quickly and easily manufactured. For example, the legs and/or side rails of the frame may be relatively straightforward to manufacture. In addition, the legs and/or side rails of the frame may be quickly and easily attached to the tabletop, which may reduce manufacturing costs. The table may also be constructed from only a few parts and a limited number of fasteners may be required, which may allow the table to be quickly and easily assembled by the manufacturer, retailer and/or consumer.

Another aspect is a table that may facilitate stacking of a plurality of tables. Advantageously, the stacked tables may be disposed in an aligned configuration. For example, one table may be easily aligned with an adjacent table, which may facilitate shipping, storage and/or display of multiple tables. Significantly, the aligned tables may be disposed vertically, horizontally, or at suitable angles depending, for instance, if the tables are to be shipped, stored, displayed, or the like. If desired, the stacked tables may interlock or have a tendency to stay together. For instance, a friction or interference fit between adjacent stacked tables may tend to maintain the tables in a stacked configuration. If the tables have a penchant to stay together, this may help reduce damage to the tables during shipping, storage and/or display.

Still another aspect is a table that may be nested with an adjacent table to reduce space. Significantly, the nested tables may allow the tables to be stored in a smaller area, which may substantially reduce storage and shipping costs. The nested tables may also allow a greater number of tables to be stored in the same area as conventional tables that do not nest together. In addition, the nested tables may help protect the tables from damage. For example, because an upper portion of a table may be disposed within a lower portion of an adjacent table, that may help prevent the table from being damaged. The nested tables may further have tabletops that are the same or substantially the same as conventional tables, which may indicate to consumers that the tables have similar appearances and characteristics such as strength, structural integrity and the like. The nested tables may also have the same general footprint as a conventional table, but the nested tables may allow significantly more tables to be disposed on a pallet or in a shipping container, and/or allow the same number of tables to be disposed in a significantly smaller space.

Yet another aspect is a table that may be nested with an adjacent table in a stacked configuration. Advantageously, the nested tables may have a significantly reduced height in comparison to conventional tables that do not nest together. For example, known tables may have a tabletop with a height of about 2.125 inches and thirty (30) of these known tables could be stacked with a height of at least 63.75 inches. An exemplary embodiment of a nested table may have a tabletop with a thickness of about 2.0 inches, but may overlap with an adjacent table by about 0.25 inches so that the height of the stacked portion of a nested table may only be about 1.75 inches. Thus, the height of thirty nested tables may be reduced to about 52.75 inches because adjacent tables may nest together. In particular, because a portion of a table may be disposed within or overlap with an adjacent table in the nested configuration, that may allow the overall height of the nested tables to be decreased. Therefore, in this exemplary configuration, the height of the table in the nested configuration may only be about 1.75 inches. Consequently, the height per nested table may be between about 0.375 and 0.25 inches less than previously known tables. This may allow more tables to be disposed in a stacked configuration, which may greatly increase the number of tables that can be stacked on a pallet or shelf, or disposed in a shipping container or truck.

Yet another aspect is a table that may be nested together with an adjacent table to reduce the overall height of the stacked tables. For example, a conventional table may have a blow-molded plastic tabletop with a height of about 2.0 inches and a frame with a height of about 1.625 inches. The height of the frame for this type of conventional table is more than eighty percent (80%) of the height of the tabletop in order to create a table with the needed strength and rigidity. The frame for this type of conventional table may have a rectangular cross-sectional configuration, which may help create a beam-type structure with two opposing walls that are separated by a generally constant distance. It was known that a decrease in the height of the frame may result in a decrease in strength of the table. It was also known that a decrease in the width of the frame may result in undesirable twisting and/or bending in the table. In contrast to these known tables, the frame may allow the nested tables to have the same general height and appearance as a conventional table, and the same general strength and structural integrity as a conventional table, but allows the tables to be nested together. This may also allow consumers to immediately deduce that the nested tables have the same general strength, rigidity and torsion resistance as a conventional table because the tables may have generally the same size and footprint. The frame of the nested tables, however, significantly decreases the height of two or more stacked tables. Because the nested tables may have a significant decrease in height in the nested configuration, this may result in considerable space savings that may be very important to the manufacturer during the manufacturing and shipping process; to the retailer when storing or displaying multiple tables; and/or to a consumer purchasing, transporting or storing more than one table.

A further aspect is a table that may be sized and configured to be nested with at least one other table such that the height of the nested tables is decreased by more than ten percent (10%). For example, the height of a single table may be about 2.0 inches. When the table is nested with another table, the table may only contribute a height of about 1.75 inches to the nested tables because a portion of the tables are nested together. In this embodiment, the nested tables result in a decrease in height of each stacked table by about 0.25 inches. Therefore, the height of a table in the stacked configuration may be about twelve and one-half percent (12.5%) less than in the non-stacked configuration. Advantageously, this may allow tables to be more efficiently stored, transported and displayed because less space may be required. In another example, a standard pallet or shipping configuration may include twenty-one (21) conventional tables, but the tables with the nesting features disclosed herein may allow twenty-seven (27) or twenty-nine (29) tables to be disposed on a standard pallet or in a typical shipping configuration. If twenty-seven tables are disposed on a pallet or in a standard shipping configuration rather than twenty-one tables, then approximately twenty-eight percent (28%) more tables can be stored, transported or displayed. If twenty-nine tables rather than twenty-one tables are disposed on a pallet or in a standard shipping configuration, then a thirty-eight percent (38%) increase in the number of tables may be realized. Advantageously, this may result in significant savings and cost advantages because, for example, considerably more tables may be stored, transported or displayed in the same area; or the same number of tables may be stored, transported or displayed in an area that is at least twenty-five percent (25%) smaller. When large volumes of tables are being transported, such as in a standard or high-capacity shipping container, this may result in sizeable cost savings and advantages.

A still further aspect is a table that may be nested with an adjacent table such that the height of a nested table is decreased by approximately twenty percent (20%). For example, the height of a conventional blow-molded plastic tabletop is typically 2.0 or more inches. The tabletop height of a nested table may be about 2.0 inches when it is not nested with another table, but the height of a stacked portion of the table may only be between about 1.5 and 1.75 inches when nested with another table. This may result in a significant reduction in height between twelve and one-half percent (12.5%) and twenty-five percent (25%) when two or more tables are nested together. In particular, if the nested tables are decreased in height by about twenty percent (20%), then the tables may have a height of about 1.6 inches in the nested configuration. Furthermore, the nested table may have a weight that is less than that of comparable conventional tables. The nested table may therefore contribute less weight when stacked or nested with one or more other tables and this may allow a greater number of nested tables to be stacked without additional weight.

Another further aspect is a table that may include a receiving portion, such as a groove, channel or recessed portion, in an upper portion of the tabletop sized and configured to receive a portion of an adjacent table to facilitate nesting of the tables. For example, the receiving portion may be disposed about an upper surface and/or outer perimeter of the tabletop. In greater detail, the receiving portion may have a generally L-shaped configuration with a lower surface generally parallel to the upper surface of the tabletop and a sidewall generally perpendicular to the upper surface of the tabletop. A portion of an adjacent table may be disposed in the receiving portion to allow the tables to be nested together. In particular, a portion of the frame, such as a projection or flange, and/or a portion of the tabletop, such as an edge or corner, may be disposed in the receiving portion. In greater detail, a portion of the side rails of the frame may be disposed in the receiving portion along the sides of an adjacent, stacked table. A lower portion of a lip and/or the corners of the tabletop may also be disposed in the receiving portion of the adjacent, stacked table.

Yet another further aspect is a table that may include a frame sized and configured to facilitate stacking of the tables. For example, the frame may include an upper portion generally aligned with a lower portion of the tabletop. The upper portion of the frame may be disposed in a frame receiving portion in the lower portion of the tabletop and this may help maintain the frame in the desired position. The frame may also include a lower portion sized and configured to contact an upper portion of an adjacent, stacked table. The frame may further include an engaging portion sized and configured to be disposed in the receiving portion of an adjacent, nested table. The engaging portion may include a downwardly extending flange or projection sized and configured to fit within a receiving portion, such as a groove or cutout, of the adjacent, nested table. Advantageously, the frame may directly support at least a portion of the weight and/or forces applied to the tables in the nested configuration, which may help prevent damage to the tables. For example, when the tables are stacked in a horizontal configuration, the frame of one table may contact the adjacent, stacked table in a manner that allows the stacked tables to support a significant amount of weight without damage to the tables. This may allow ten, twenty, thirty or more tables to be disposed in a stacked configuration without damaging any of the tables. In addition, if the engaging portion of the frame is disposed in a receiving portion of an adjacent table, that may facilitate stacking, storing and/or shipping of the tables because that may help maintain the tables in the stacked configuration and ensure the weight is properly and/or evenly distributed.

Still yet another further aspect is a table that may be sized and configured to nest with an adjacent, stacked table in which a weight or load is supported in multiple areas, in different locations and/or by different surfaces. Advantageously, the multiple contact areas may allow stresses and forces to be disposed over a larger area and that may help prevent damage to the tables. For example, the table may include one or more contact areas sized and configured to contact the upper surface of the adjacent tabletop. In greater detail, the side rails of the frame may include a lower portion, such as a planar contact surface or load bearing surface, disposed generally parallel to an upper surface of the tabletop. In addition, the side rails of the frame may include an engaging portion, such as a downwardly extending flange or projection, sized and configured to be disposed in a receiving portion of the adjacent, stacked table. A lower portion of the flange may contact a lower surface of the receiving portion, which may be another load bearing surface. Additionally, the table may include other portions, such as corners or lips, sized and configured to be disposed in the receiving potion of the adjacent, stacked table. For instance, the corners and/or lips may include a compression edge that contacts the lower surface of the receiving portion, which may also be load bearing surfaces. When two or more tables are nested together, the multiple contact areas may facilitate stacking of the tables without marring or otherwise damaging the tables.

Another aspect is a table that may include a tabletop with one or more portions formed from compression molded plastic. For example, a portion of the corners and/or lip may be compression molded during a blow-molding process. Advantageously, the compression molded corners and/or lip may help create stronger, more rigid and/or more impact resistant structures, which may increase the durability and usefulness of the table. Significantly, compression molding may allow a portion of the corners and/or lip to be relatively thin because there is little or no gap or space between the walls of the compression molded plastic structure. The compression molded corners and/or lip may also be sized and configured to fit within a receiving portion of an adjacent, stacked table, which may facilitate stacking and nesting of the tables. The compression molded portions may further be sized and configured to contact a portion of the frame. For instance, a compression molded portion may be disposed along at least a portion of the lip and the side rail of the frame may contact or abut the compression molded portion, which may help position and maintain the frame in the desired position.

Still another aspect is a table that may include a compression edge. For example, if the tabletop is constructed from blow-molded plastic, the compression edge may be formed by the outer wall being folded onto itself such that the compression edge has a thickness approximately equal to twice the outer wall thickness. The compression edge may be disposed about all or a portion of the perimeter of the tabletop, such as the edges and/or corners. Advantageously, the compression edge may help provide increased strength, stiffness, structural integrity and/or impact resistance. The compression edge may also be sized and configured to be at least partially disposed in the receiving portion of an adjacent, nested table.

Yet another aspect is a table that may include a compression edge with different sizes. For example, the corners of the tabletop may include a compression edge that has a different size than a compression edge extending along the sides and/or ends of the tabletop. In particular, the tabletop may include a downwardly extending lip and the corners may include a compression edge that has a height generally equal to or greater than a majority of the height of the lip. The corners may also include a compression edge with a height generally or at least substantially equal to the height of the lip. The sides of the tabletop could include a compression edge that is smaller than the compression edge in the corners. For instance, the sides of the tabletop could include a compression edge with a height that is generally equal to or less than the height of the lip. The height of the compression edge disposed along the sides and/or ends of the tabletop may also be significantly smaller than the height of the lip. In an exemplary embodiment, the compression edge disposed along the sides of the tabletop may have a height between about 0.125 inches and about 0.25 inches, and the corners may include a compression edge with a height between about 0.25 inches and about 0.5 inches. The compression edge along the ends of the tabletop may have a height between about 0.125 inches and about 0.5 inches. Thus, the compression edge in the corners and/or ends of the tabletop may be two times or more times larger than the compression edge along the sides. The compression edges in the corners may be much larger, if desired, such as three, four, five or more times the height of compression edge along the sides and/or ends.

Still yet another aspect is a table that may include a handle or grip disposed in one or both ends of the tabletop. The handle may consist of a recess or opening in the downwardly extending lip of a tabletop and the handle may be integrally formed with the tabletop as part of a unitary, one-piece construction. Preferably, the handle is sized and configured to facilitate moving and transporting the table. In addition, the handle may assist in separating the tables in a stacked configuration. The tabletop may further include recesses or openings that may allow a portion of the frame to be disposed along the sides of the tabletop. For example, the sides of the tabletop may include openings that allow at least a portion of the frame to be exposed. Therefore, the ends of table may include openings in the lip that form the handles and openings in the sides that allow a portion of the frame to be exposed. Other portions of the frame may be inset and/or disposed inwardly from an outer perimeter of the tabletop, which may help protect the frame from damage.

Another aspect is a table that may include a frame with a first portion disposed along one side of the tabletop and a second portion disposed along a second side of the tabletop. In particular, the frame may include a first side rail disposed along a first side of the tabletop and a second side rail disposed along a second side of the tabletop. The side rails may extend along a length and/or width of the tabletop and the side rails may help support the tabletop and/or facilitate connection of the legs to the tabletop. Each side rail may include a body and the body may be elongated, have one or more engagement surfaces, and may be constructed from relatively strong materials such as metal. In greater detail, the body of the side rails may be disposed at least proximate a downwardly extending lip of the tabletop and the body of the side rails may be disposed generally vertically relative to the tabletop. The side rails may also include an upper portion and a lower portion. For example, the upper portion of the side rail may include a flange that extends inwardly at angle, such as a right angle, to the body. The upper portion of the side rail may also include a second flange, such as an inner flange, that extends downwardly. This inner flange may be disposed at least proximate an end of the upper portion of the side rail and it may be disposed generally parallel to the body of the side rail. The lower portion of the side rail may include a flange that extends outwardly towards an outer portion of the tabletop. The lower portion may also include a downwardly extending portion, such as a flange or projection, which may be disposed perpendicular to the lower portion of the side rail. If desired, the downwardly extending portion may have twice or double the thickness in comparison to other portions of the frame. In particular, the downwardly extending portion may be folded or bent back upon itself and include an upwardly extending portion sized and configured to contact a portion of the tabletop, such as a lower surface of the downwardly extending lip.

Yet another aspect is a table that may include a tabletop with one or more receiving portions sized and configured to receive a portion of the frame. For instance, the tabletop may include a frame receiving portion sized and configured to receive an upper portion of the side rail of the frame. In addition, the tabletop may include a sidewall sized and configured to contact the body of the side rail and a lip sized and configured to contact the lower portion of the side rail. If desired, an inner wall of the lip may form at least a portion of the sidewall and a lower portion of the lip may contact the lower portion of the frame. Advantageously, the tabletop may be sized and configured to help position and/or maintain the side rail in a desired position. Additionally, the tabletop may be sized and configured to help prevent the side rail from bending, twisting or otherwise moving, which may help create a stronger and sturdier table.

Still another aspect is a table that may include a frame with one or more generally L-shaped and/or U-shaped sections. For instance, the side rails of the frame may include an upper portion with a generally inverted U-shaped configuration and a lower portion with a generally U-shaped configuration. The upper portion of the frame may be sized and configured to be disposed in a frame receiving portion disposed in a lower or underneath portion of the tabletop. The lower portion of the frame may be sized and configured to contact an adjacent table in a stacked, nested configuration. In particular, the lower portion of the frame may include a lower surface sized and configured to contact an upper surface of adjacent table in the nested configuration. The lower portion of the frame may further include an engaging portion sized and configured to be disposed in a receiving portion of an adjacent table in the nested configuration.

Still yet another aspect is a table that may include a frame that facilitates nesting and stacking of a plurality of tables. The frame may also help support a downwardly extending lip of the tabletop. For example, the frame may support an inner surface, lower surface and/or outer portion of the lip. In addition, the frame may provide multiple contact areas, such as a planar engagement surface and an engaging portion or flange, which may allow a load to be distributed over multiple areas when multiple tables are nested together. This may allow more tables to be disposed in a stacked configuration and/or help prevent damage to the tables.

A further aspect is a table that may include a frame with an inwardly disposed portion and an outwardly disposed portion. For example, the frame may include a first portion disposed towards an inner portion of the tabletop and a second portion disposed towards an outer portion of the tabletop. The inwardly disposed portion may be at least partially or substantially disposed inwardly from a downwardly extending lip of the tabletop while the outwardly disposed portion may contact and/or enclose at least a portion of the lip.

Another further aspect is a table that may include a frame and a portion of the frame may be disposed along an edge or perimeter of the tabletop. For example, the tabletop may include a lip with an opening and an outer portion of the frame may be disposed in or at least proximate the opening. Advantageously, this may allow a portion of the frame to be exposed and the exposed portion of the frame may indicate to consumers the table is strong, high-strength and durable. The exposed portion of the frame may be generally aligned with and/or spaced inwardly from an outer perimeter of the tabletop. The exposed portion of the frame may also be generally aligned with a lower portion of the tabletop, such as a lower surface of the corners, lip and/or ends. In greater detail, an opening may be disposed in the lip along the sides of the tabletop and the exposed portion of the frame may be disposed in and/or generally aligned with the openings. The lower portion of the frame may be aligned with a lowermost portion of the tabletop or it could extend outwardly more than other portions of the tabletop. Thus, in this configuration, the lower portion of the frame may form the lowermost portion of the tabletop. The exposed frame may also create a table with improved aesthetics and/or style. For instance, the exposed frame may provide a color contrast with the tabletop. That is, the tabletop may be one or more colors and the frame may have one or more different colors to create a table with a stylized appearance or an aesthetically pleasing design.

Yet another further aspect is a table that may include a tabletop with openings to allow a portion of a frame to be exposed and/or disposed proximate a perimeter of the tabletop. For example, the tabletop may include one or more openings that allow at least a portion of the frame to be exposed and disposed at least proximate the perimeter of the tabletop. These openings may extend along at least a majority of the length of the tabletop. The tabletop may also include one or more openings for a handle in the ends of the tabletop. The openings along the sides of the tabletop are preferably much larger than the openings in the ends of the tabletop, by a factor such as five, ten, twenty or more times the length of the opening for the handle.

A still further aspect is a table that may include a frame that contacts, engages and/or supports a lip and/or outer perimeter of the tabletop. Advantageously, if the frame is disposed along the outer edges of the tabletop, then the frame may provide increased support for the edges or extremities of the tabletop. In addition, if a portion of the frame is disposed below or proximate the lip, then the frame may help prevent the tabletop from being damaged. For example, the frame may absorb impacts or forces that otherwise may damage the tabletop.

Still yet another further aspect is a table that may include a frame with an engaging portion, such as a protrusion or flange, which facilitates nesting and stacking of the tables. The protrusion may be generally aligned with and/or disposed proximate a lower portion of the lip, such as a compression edge. Because the protrusion and compression edge may have double wall thicknesses, this may help prevent the table from being damaged. In greater detail, the protrusion may be formed by bending or folding the frame back upon itself so that it includes two adjacent, parallel walls and a rounded end. The compression edge may include an inner wall and an outer wall that are adjacent, parallel and preferably in contact. If desired, the protrusion and compression edge may include lower surfaces that are generally aligned and disposed in the same plane. Advantageously, the double wall thicknesses of the frame and lip may help prevent that tabletop from being damaged. Additionally, the double wall thicknesses may promote stacking and nesting of the tables because, for example, it may allow a strong, thin, resilient and/or damage resistant portion of a table to be disposed in a receiving portion of an adjacent table.

Another aspect is a frame for a table that may be less likely to undesirably bend or deform. For example, the frame may have a configuration that resists twisting or rotating when a load or force is applied to the frame. In addition, the frame may provide more balanced loading on the table when a load or force is applied. For instance, the frame could include multiple bends or angles, such as a plurality of right or 90° angles. Advantageously, the multiple right angles may help increase the strength of the frame, resist twisting or rotating when a load or force is applied to the frame, and/or provide more balanced loading. The frame could also include one or more portions that are bent back or folded with a 180° angle such that portions of the frame have twice the thickness. This may also help increase the strength of the frame, resist twisting or rotating when a load or force is applied to the frame, and/or provide more balanced loading.

Yet another aspect is a table that may include a frame that is at least partially disposed in one or more receiving portions in the tabletop. The tabletop may also include one or more receiving portions that are sized and configured to receive other components of the table such as cross members, cross bars and the like. For example, the tabletop may include receiving portions that are sized and configured to receive an upper portion of a support structure. The tabletop may also include receiving portions that are sized and configured to receive a portion of the legs when the legs are in the collapsed position. In addition, the frame may include one or more openings that are sized and configured to facilitate attachment of the legs to the table. For instance, the frame may include openings that are sized and configured to receive the ends of a cross member and/or upper portion of a support structure. Depending upon the shape and arrangement of the frame, the openings in the frame may be circular or non-circular configuration. By extending the ends of the cross tube through openings in the frame, the legs may be securely connected to the tabletop.

Still another aspect is a table that may include a frame and leg assemblies that are constructed from relatively strong and durable materials such as metal, steel and the like. It will be appreciated, however, the frame and leg assemblies may be constructed from other materials with suitable properties and characteristics. In addition, the table, frame, leg assemblies and the like may have a variety of ether suitable shapes, sizes, configurations and arrangements depending, for example, upon the intended use of the table.

Another aspect is a table that may include a tabletop with a plurality of depressions. The plurality of depressions may be closely spaced and may cover at least a majority, substantially all, virtually all or all of a lower surface of the tabletop. The plurality of depressions may be disposed in a generally uniform pattern in which the depressions have generally the same size, shape configuration, orientation and arrangement. In addition, at least a majority of the depressions in the plurality of depressions may be spaced apart from one or more adjacent depressions by a generally consistent or uniform distance. Advantageously, the depressions may help create a tabletop with increased strength, rigidity and/or structural integrity. In addition, if the depressions in the plurality of depressions are generally uniformly spaced and disposed in a generally uniform pattern, that may help create a tabletop with generally uniform characteristics.

Yet another aspect is a tabletop that may include strengthening members, such as depressions, ribs, channels and the like, disposed proximate and/or adjacent structural support members or features of the table. For example, the tabletop may include a plurality of strengthening members disposed proximate and/or adjacent the frame. In greater detail, the tabletop may include one or more frame receiving portions that are sized and configured to receive the side rails of the frame and the frame receiving portions may include a plurality of strengthening members. When the frame is connected to the tabletop, the frame may cover all or a portion of the strengthening members in the frame receiving portion. The strengthening members in the frame receiving portions may be disposed in different arrangements and/or configurations, which may be used to create areas of increased strength and/or different characteristics. For instance, the strengthening members may be disposed in first and second configurations. In particular, the first configuration of strengthening members may be generally aligned in a first direction, such as along the length of the tabletop, while the second configuration of strengthening members may be generally aligned in a second direction, such as along a width of the tabletop. The first configuration of strengthening members may provide greater strength in one direction or location and the second configuration of strengthening members may provide greater strength in a second direction or location. Because the strengthening members can provide additional strength in different directions and/or locations, that may allow relatively strong, sturdy, stiff and/or rigid structures to be constructed.

Still another aspect is a tabletop that may include strengthening members with different configurations and/or disposed in different locations to prevent or minimize potential points of weakness, stress concentrations and the like. For example, the strengthening members may be sized and configured to support areas of the tabletop disposed outside of the frame. The strengthening members may also be sized and configured to help prevent the tabletop from bending, collapsing or deflecting when a load or force is applied to the tabletop. Further, the strengthening members may be sized and configured to help prevent the tabletop from twisting or rotating relative to the frame. Advantageously, because the strengthening members may help support portions of the tabletop disposed above the frame and/or the edges; a strong, sturdy and well-supported table may be created. This may further facilitate stacking and nesting of the tables because, for example, the lower tables in the stack of tables may be unlikely to be damaged by the weight of the stacked tables.

Still yet another aspect is a tabletop that may include one or more strengthening members disposed between and/or connecting a frame receiving portion and an outer portion of the tabletop such as a lip. In particular, one or more strengthening members may connect the frame receiving portion and a portion of the lip, such as an inner wall or sidewall of the lip. In greater detail, one or more strengthening members may be at least partially disposed in the upper surface and/or sidewalls of the frame receiving portion and in at least a portion of a sidewall of the lip. Because the strengthening members may connect the frame receiving portion and the lip, the strengthening members may increase the strength and/or structural integrity of the frame receiving portion and/or the lip. Additionally, because the frame may cover at least a portion of the frame receiving portion and the sidewall of the lip, these strengthening members may be generally hidden from view.

A further aspect is a tabletop that may include a plurality of strengthening members that are generally aligned with one another. For instance, the strengthening members may include a body that is generally aligned with an axis and each strengthening member of the plurality of strengthening members may be generally aligned along the same axis or parallel axes. Advantageously, because the strengthening members generally aligned with an axis may have increased strength, structural integrity and/or other characteristics in a particular direction, such as along the axis, aligning the strengthening members along the same axis or parallel axes may help create a tabletop with generally uniform properties and characteristics. The tabletop may further include another plurality of strengthening members that are generally aligned along a different axis. For example, the strengthening members disposed along the different axis may provide increased strength, structural integrity and/or other characteristics along this axis. Therefore, the strengthening members disposed along different axes may be used to created portions of the tabletop with different characteristics. This may allow, for example, some of the strengthening members in the frame receiving portion to be disposed along a first axis, such as generally aligned with a length of the tabletop, and other strengthening members to disposed along a second axis, such aligned with a width of the tabletop. If desired, one or more of the strengthening members may be sized and configured to help support the outer edges or sides of the tabletop. For instance, the strengthening members may help prevent the outer edges of the tabletop, which may not be directly supported by the frame, from unintentionally bending, twisting or deflecting.

A still further aspect is a tabletop may include strengthening members, such as ribs, disposed in an outer edge or lip of the tabletop. For example, the tabletop may include a lip or edge and a plurality of strengthening members may be formed in the lip. In particular, the inner surface of the lip, such as a sidewall, may include a plurality of inwardly extending strengthening members. In addition, these strengthening members may be at least partially disposed in a frame receiving portion. Significantly, the strengthening members may provide increased strength, stiffness, rigidity and/or structural integrity to portions of the tabletop such as the portion of the tabletop disposed above the frame and portions of the tabletop that extend beyond the frame such as the lip. Advantageously, the strengthening members may also help prevent undesired bending, twisting or deflecting of the tabletop.

Another further aspect is a tabletop that may include strengthening members and depressions with different shapes, sizes, arrangements, orientations and/or configurations. For example, the majority or substantially the entire center portion of the tabletop may include depressions with generally uniform shapes, sizes, arrangements, orientations and configurations. This may help create a tabletop with generally constant characteristics. The side or edges of the tabletop, however, may include depressions or strengthening members with different shapes, sizes, arrangements, orientations and/or configurations. For instance, the edges of the tabletop may include a first group of depressions generally aligned in a first direction and a second group of depressions generally aligned in a second direction. If desired, the first direction may be generally perpendicular, or at an angle such as about 30°, 45° or 60°, to the second direction. Because the depressions or strengthening members may be aligned in different directions, portions of the tabletop may have different characteristics. The strengthening members proximate the edges of the tabletop may also have different configurations. For example, a first group of strengthening members may be disposed in frame receiving portion and a second group of strengthening members may be disposed in at least a portion of the frame receiving portion and the lip. These strengthening members may support the portion of the tabletop disposed above the frame and/or the portion of the tabletop extending beyond the frame.

Yet another further aspect is a tabletop that may include a receiving portion in an upper portion of the tabletop sized and configured to receive an engagement portion of an adjacent table in a nested configuration. The receiving portion may be supported by strengthening members in the lower portion of the tabletop. For example, the strengthening members may extend inwardly into the lip along the sides of the tabletop and/or be disposed in the lower surface of the tabletop. An inner portion of the strengthening members may contact, engage or abut an inner portion of the receiving portion to provide increased strength, support, rigidity and/or structural integrity for the receiving portion. Advantageously, this may allow multiple tables to be stacked together because the receiving portion can withstand a much greater amount of weight and force from the nested tables.

Still yet another further aspect is a tabletop that may include a generally uniform pattern of depressions disposed in a plurality of generally aligned rows that extend across a lower surface of the tabletop. The tabletop may also include a plurality of channels in the lower surface that are aligned with the rows of depressions. The lower surface of the tabletop may further include a recess sized and configured to receive a structural support member such as a cross bar. The channels may be disposed on both sides of the structural support member recess and the ends of the channels may be disposed towards a side or end of the tabletop. In addition, a plurality of depressions may be disposed in a lower portion of the channels. The channels and depressions may be sized and configured to provide extra strength, rigidity, structural integrity and/or torsion resistance proximate the structural support members and/or the ends of the tabletop. In greater detail, the channels may be aligned with the rows of depressions and the channels may have different lengths. The width of the channel may be generally equal to the width of the depressions in the lower surface of the tabletop. The depressions in the channels may have generally the same shape, configuration and arrangement as the pattern of depressions in the lower surface, but with a smaller size. The depressions in the channels may be disposed in generally the same pattern, arrangement and spacing as the depressions in the lower surface, which may provide minimal or no disruption to the support of the upper surface of the tabletop. This may allow the tabletop to have generally uniform characteristics such as strength, rigidity, structural integrity and/or torsion resistance.

A further aspect is a table that may include a combination of features, aspects and the like, such as one or more of those discussed above. For example, the table can include a frame with engaging portions that are sized and configured to be disposed in a receiving portion of an adjacent table when the tables are nested together. The table can also include one or more compression edges sized and configured to be disposed in the receiving portion of the adjacent, nested table. Thus, the frame and compression edges may facilitate alignment and nesting of the tables in a stacked configuration. Further, the table may include depressions or strengthening members disposed proximate or adjacent portions of the frame, such as the side rails, and these structures may be sized and configured to increase the strength, rigidity and/or structural integrity of the portion of the tabletop disposed above and/or proximate the frame, and/or portions of the tabletop that are not directly supported by the frame. In addition, the table may include depressions and/or strengthening members disposed at an angle relative to the bottom surface of the tabletop. For instance, the table may include strengthening members in the lip disposed perpendicular to the lower surface of the tabletop. Additionally, the table may include openings or recesses in the sides that allow a portion of the frame to be exposed and readily visible when the table is being used or stored, and openings in the ends to create handles.

A still further aspect is a table that may be constructed from one or more materials and processes. For example, the tabletop may be constructed from molded plastic, such as blow-molded plastic. The frame and legs may be constructed from high-strength materials such as steel. In particular, the frame and/or legs may be constructed from high-strength, low-alloy (HSLA) steel rather than traditional carbon steel. Importantly, HSLA steel may be twenty to thirty percent (20 to 30%) lighter than carbon steel with the same strength. Therefore, a table constructed with HSLA steel may be lightweight and have the same strength as a conventional table constructed with a carbon steel fame because a smaller gage of HSLA steel can be used. For example, sixteen (16) or eighteen (18) gage HSLA steel may be used to construct the table, which is smaller than traditional steel. HSLA steel, however, has not been previously used in this or other related industries because it is much more expensive than traditional steel. That is, HSLA steel is cost prohibitive. The reduction in the amount of steel required to manufacture the table with one or more of the features disclosed herein, however, may be more than sufficient to offset or justify the price of the more expensive HSLA steel. In particular, because the amount of steel required to create the table with the disclosed features may be significantly less than the amount of steel required to create a corresponding traditional table, HSLA steel may no longer be cost prohibitive. Thus, because less steel may be required and/or HSLA steel may be stronger and lighter weight, the table can be manufactured with HSLA steel.

Another further aspect is a table that may include legs with support members that are widely spaced, which may help create a sturdy table that is unlikely to undesirably move or wobble. The table may also include a tabletop with various shapes, sizes, configurations and arrangements, such as rectangular, square, circular, oblong and the like. In addition, the tabletop may include one or more openings to allow, for example, a portion of the frame to be exposed and/or to create a handle or grip.

These and other aspects, features and advantages of the present invention will become more fully apparent from the following brief description of the drawings, the drawings, the detailed description of preferred embodiments and appended claims.

BRIEF DESCRIPTION OF THE DRAWINGS

The appended drawings contain figures of exemplary embodiments to further illustrate and clarify the above and other aspects, advantages and features of the present invention. It will be appreciated that these drawings depict only exemplary embodiments of the invention and are not intended to limits its scope. Additionally, it will be appreciated that while the drawings may illustrate preferred sizes, scales, relationships and configurations of the invention, the drawings are not intended to limit the scope of the claimed invention. The invention will be described and explained with additional specificity and detail through the use of the accompanying drawings in which:

DETAILED DESCRIPTION OF PREFERRED EMBODIMENTS

The present invention is generally directed towards tables. The principles of the present invention, however, are not limited to tables. It will be understood that, in light of the present disclosure, the tables disclosed herein can have a variety of shapes, sizes, configurations and arrangements. In addition, while the tables shown in the accompanying figures are banquet or utility tables, it will be appreciated the tables may have any suitable style or configuration such as round, personal, conference or card tables. Further, the invention disclosed herein may be successfully used in connection with other types of furniture and/or structures.

Additionally, to assist in the description of preferred embodiments of the tables, words such as top, bottom, front, rear, right and left may be used to describe the accompanying figures which may be, but are not necessarily, drawn to scale. It will further be appreciated the tables can be disposed in a variety of desired positions or orientations, and used in numerous locations, environments and arrangements. A detailed description of preferred embodiments the table now follows.

Figure 1:
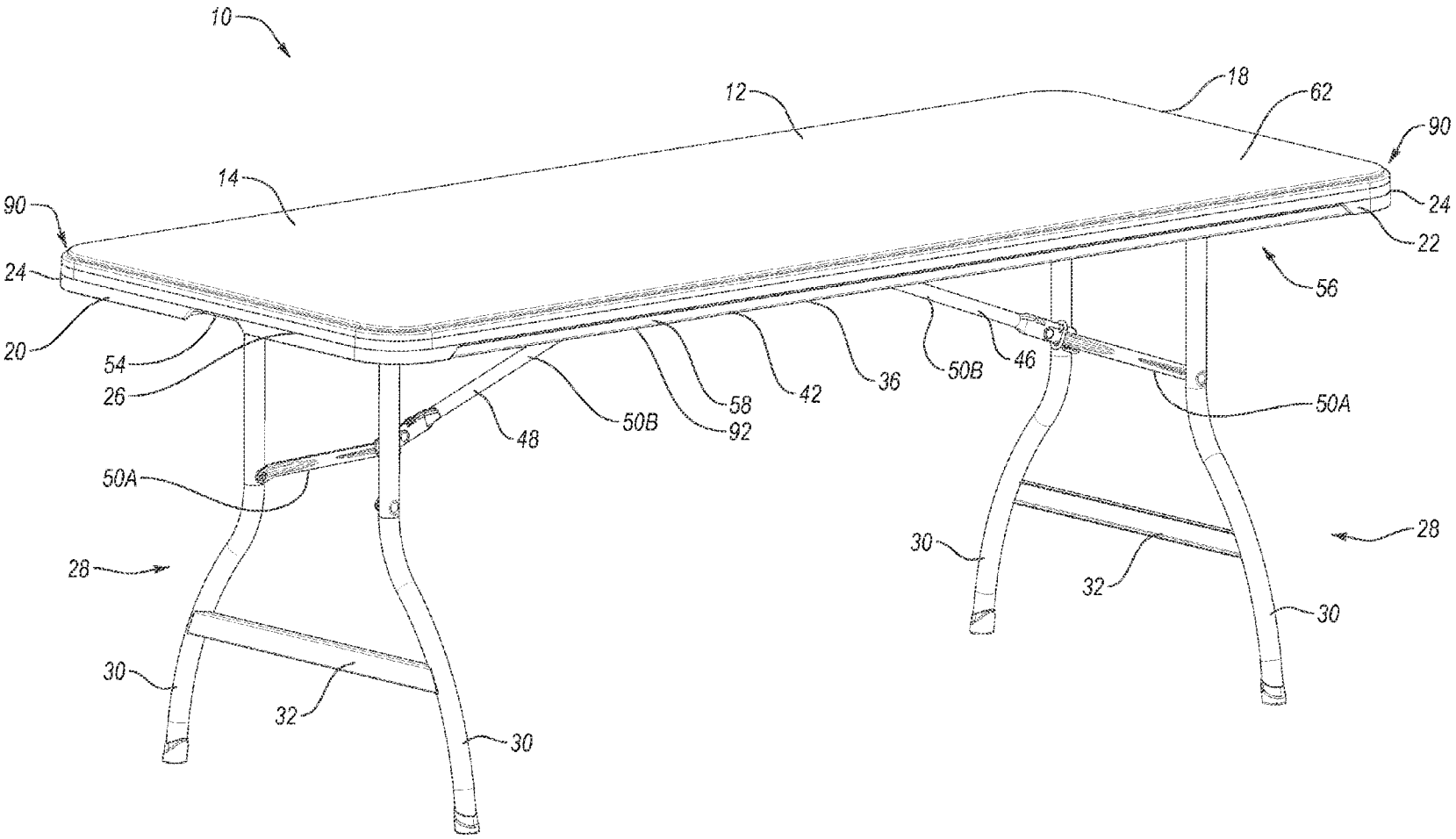
FIG. 1 is an upper perspective view of an exemplary table.
Figure 2:
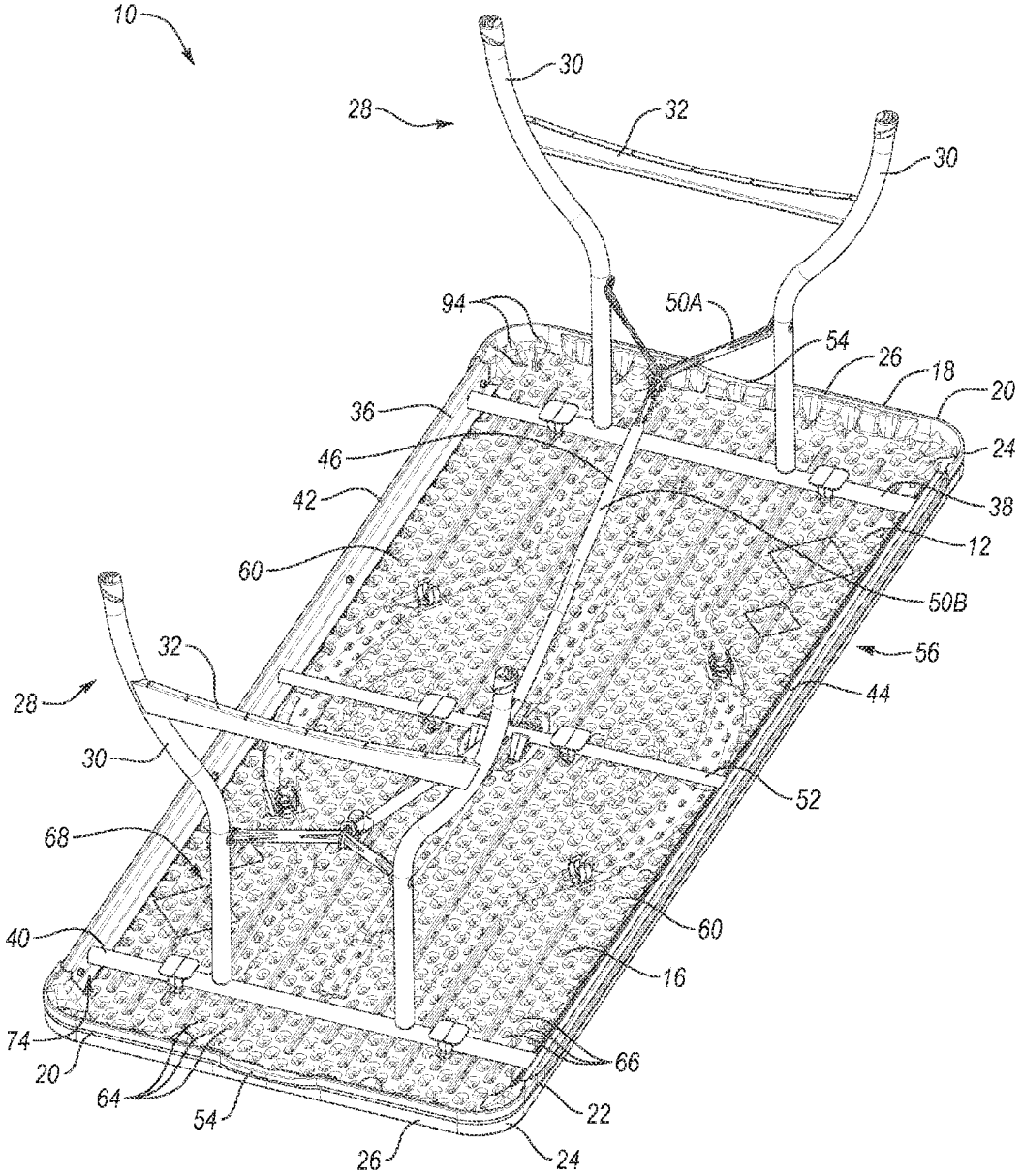
FIG. 2 is a lower perspective view of the table, illustrating the support structures in an extended or use position.
Figure 3:
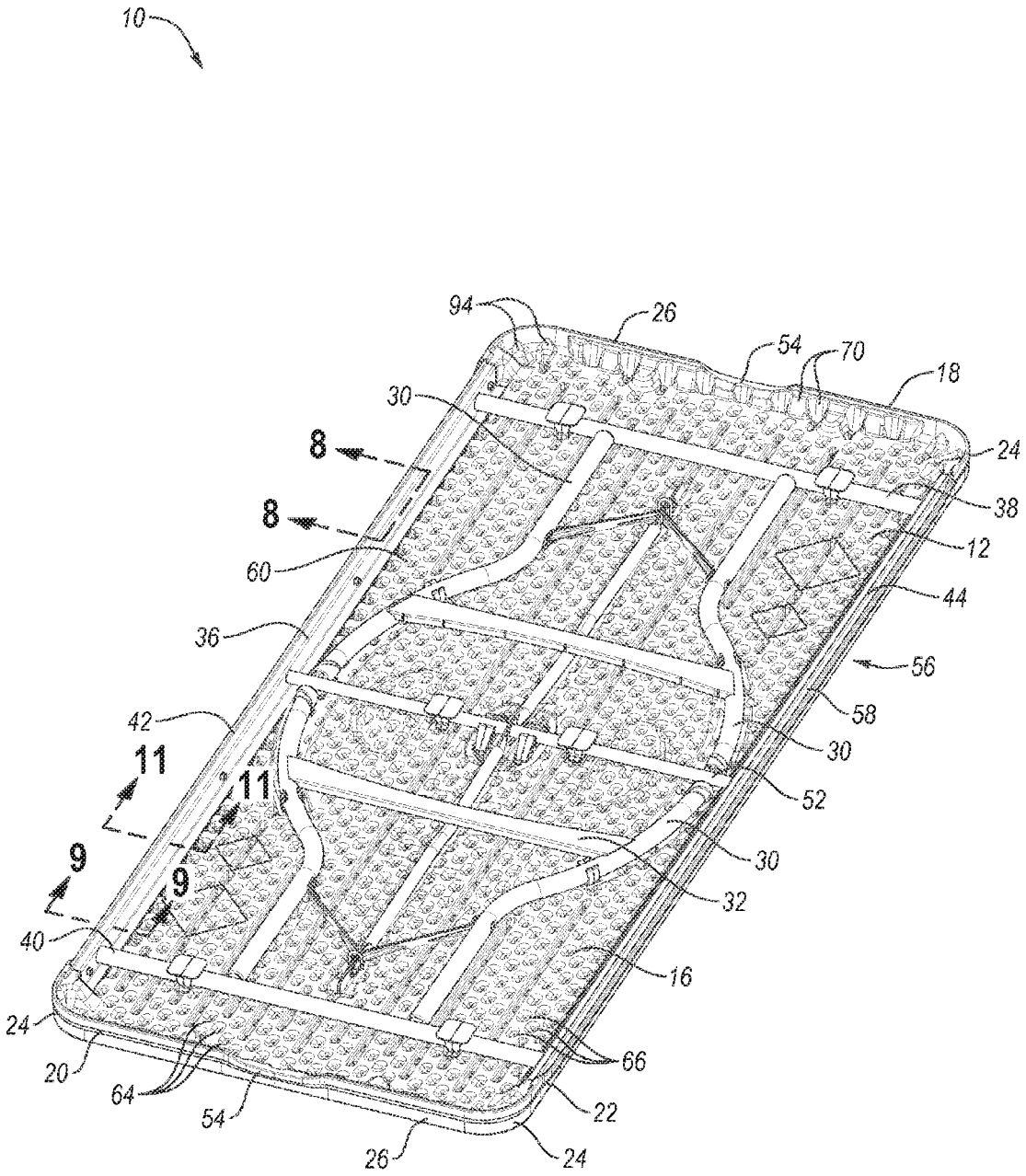
FIG. 3 is another lower perspective view of the table, illustrating the support structures in a collapsed or storage position.
Figure 4:
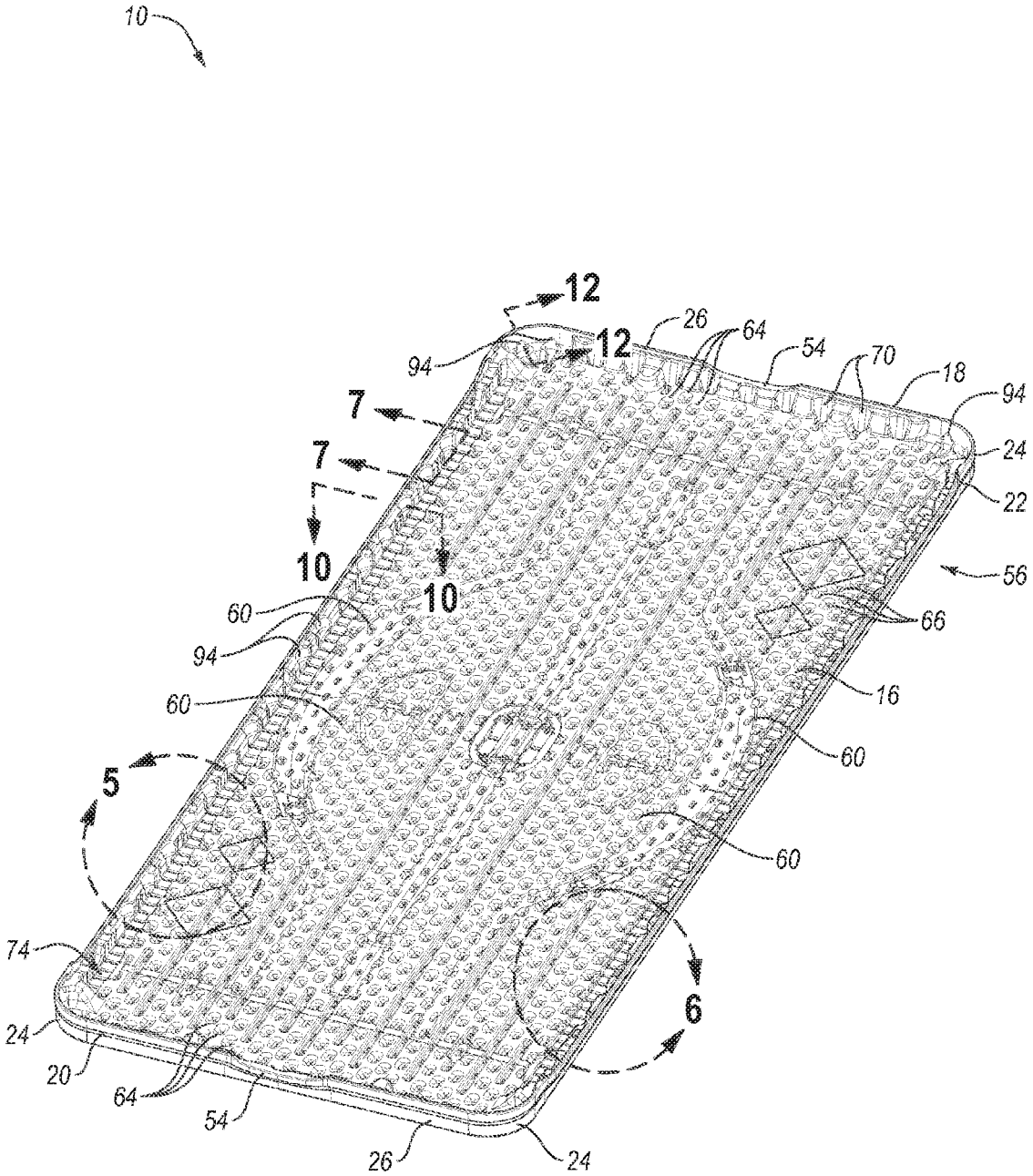
FIG. 4 is a lower perspective view of a portion of the table, illustrating the tabletop.
Figure 6:
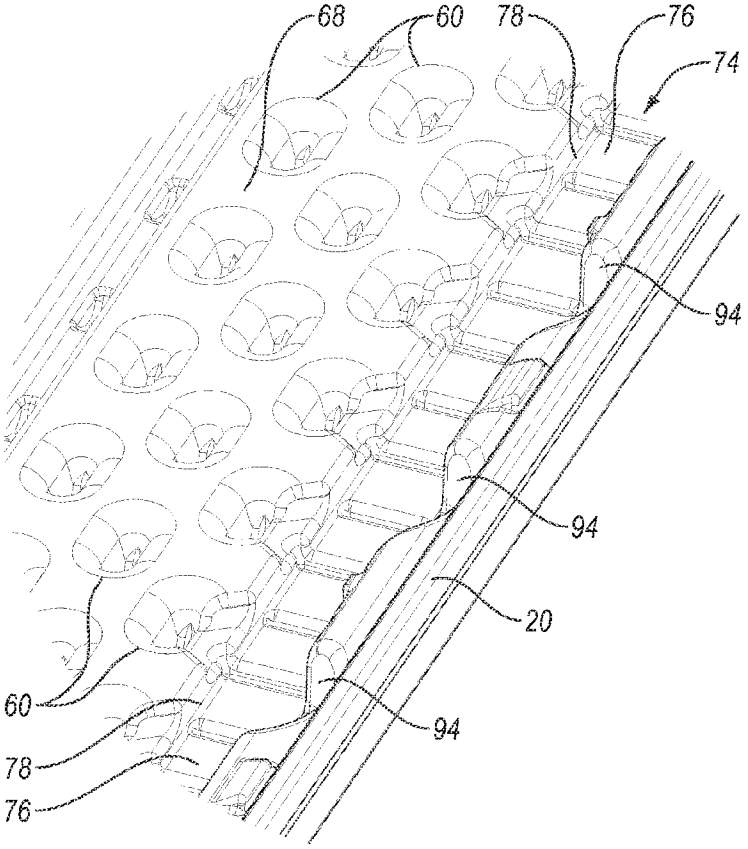
FIG. 6 is an enlarged lower perspective view of a portion of the tabletop designated by broken lines labeled 6 in FIG. 4.

As shown in FIGS. 1 and 2, an exemplary table 10 may include a tabletop 12 and the tabletop may be constructed from molded plastic. The tabletop 12 may include an upper portion 14, which may be aligned with an upper surface; a lower portion 16, which may be aligned with a lower surface; and a perimeter 18. As shown in the accompanying figures, a sidewall may be disposed about the perimeter 18 of the tabletop 12. The upper portion 14 may be spaced apart from the lower portion 16 of the tabletop 12 by a distance, which may be a generally constant distance. The tabletop 12 may also include a hollow interior portion disposed between the upper and lower portions 14, 16 of the tabletop. In addition, the tabletop 12 may include a lip 20, which may extend downwardly from the lower portion 16 of the tabletop when the tabletop is oriented with the upper surface facing up as shown in FIG. 1. The tabletop 12 may further include one or more sides 22, corners 24 and ends 26 depending, for example, upon the shape and configuration of the table 10. The tabletop 12, including the upper portion 14, the lower portion 16, the hollow interior portion, the lip 20, the sides 22, the corners 24 and/or the ends 26, may be integrally formed as part of unitary, one-piece structure during the molding process. If the tabletop 12 is constructed from plastic, it may be formed in the desired shape by blow-molding, injection molding, rotary molding, and/or other suitable processes. It will also be appreciated that the tabletop 12 may be constructed using various materials such as wood, metal and the like.

The table 10 may include a one or more support structures 28, which may be sized and configured to support the tabletop 12 above a surface such as the floor or ground. The support structures 28 may include one or more legs or supports 30 and the support structures may be movable between an extended or use position and a collapsed or storage position relative to the tabletop 12. As shown in the accompanying figures, the support structures 28 may include a pair of legs or supports 30 and a connecting member 32 may interconnect the supports.

The table 10 may also include a frame 36 connected to the tabletop 12. If desired, the support structures 28 may be connected to the frame 36 and the support structures may be movably connected to the frame 36 to allow the legs 30 to move between an outwardly extending or use position and a collapsed or storage position. For example, the support structures 28 may include or be connected to cross members 38, 40 and the legs 30 may be connected to the cross members. The cross members 38, 40 may be connected to the frame 36. In particular, the frame 36 may include elongated members, such as side rails 42, 44, and the cross members 38, 40 may be connected to the side rails. It will be appreciated that the cross members 38, 40 may also be part of the frame 36.

The support structures 28 and/or the legs 30, however, do not have to be connected to the cross members 38, 40 or the frame 36. Instead, the support structures 28 and/or legs 30 may be connected to any suitable portions of the table 10. It will also be appreciated that the table 10 may include any suitable number of support structures 28 and/or legs 30 depending, for example, upon the intended use of the table. In addition, it will be appreciated that the tabletop 12, the support structures 28 and the legs 30 may have various sizes, shapes, configurations and arrangements depending, for example, upon the intended use of the table 10. It will further be appreciated that the frame 36, the side rails 42, 44 and/or the cross members 38, 40 are not required, and the table 10 may have other components, features, aspects, characteristics and the like, if desired.

The table 10 may include first and second brace assemblies 46, 48, which may be connected to the support structures 28. In particular, the brace assemblies 46, 48 may be connected to the legs 30 and may be sized and configured to allow the legs to move between the use and storage positions. As shown in FIG. 2, the brace assemblies 46, 48 may include a first portion 50A connected to the legs 30 and a second portion 50B connected to a cross member 52 and/or the tabletop 12. The first and second portions 50A, 50B may be interconnected to form the brace assemblies 46, 48.

Figure 13:
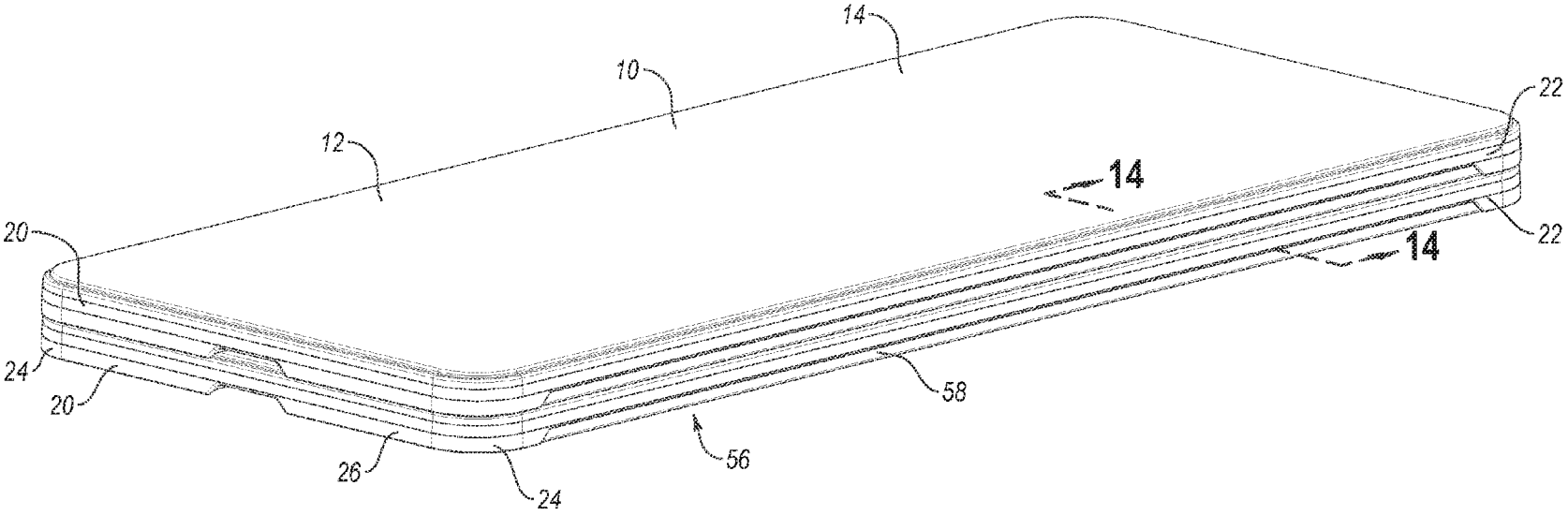
FIG. 13 is an upper perspective view of two exemplary tables disposed in a nested and stacked configuration.
Figure 14:
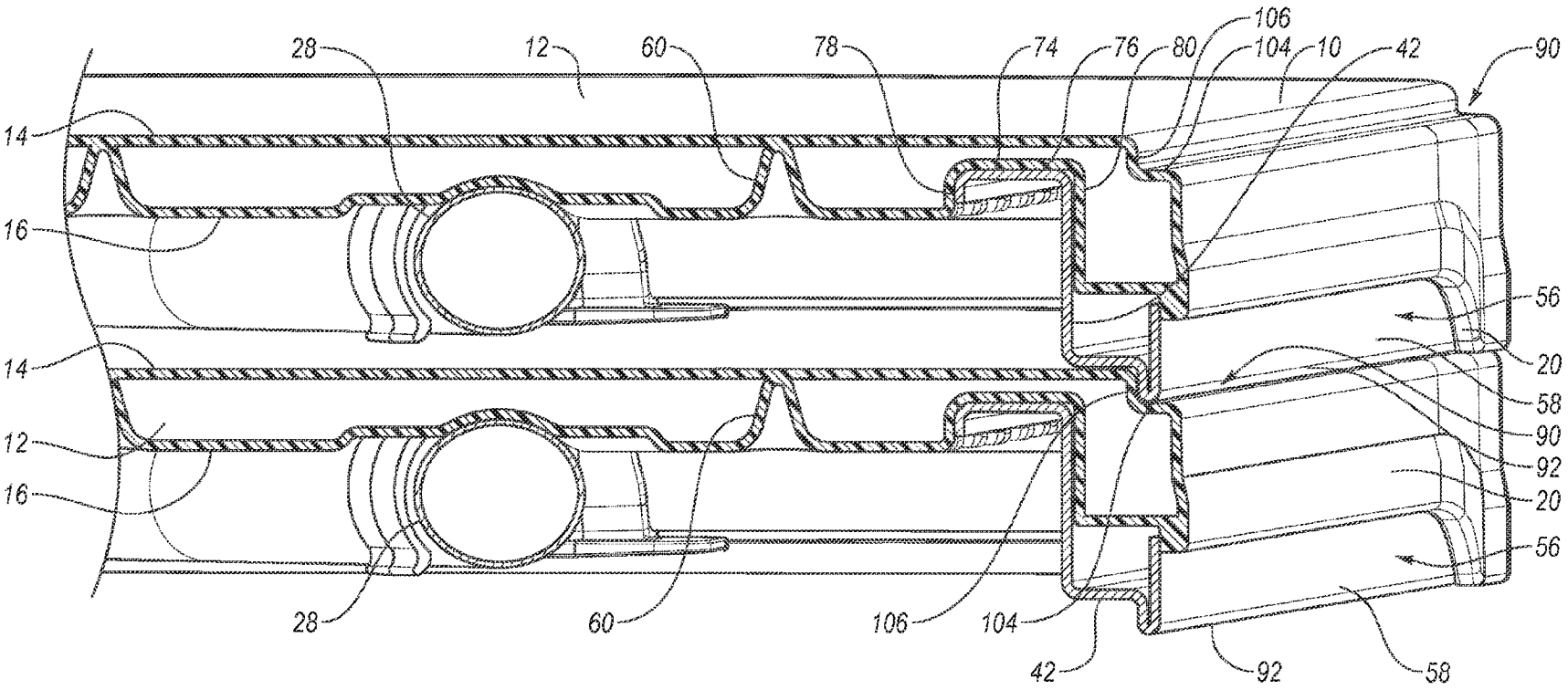
FIG. 14 is a cross-sectional side view along section line 14-14 of a portion of the tables shown in FIG. 13.
Figure 15:
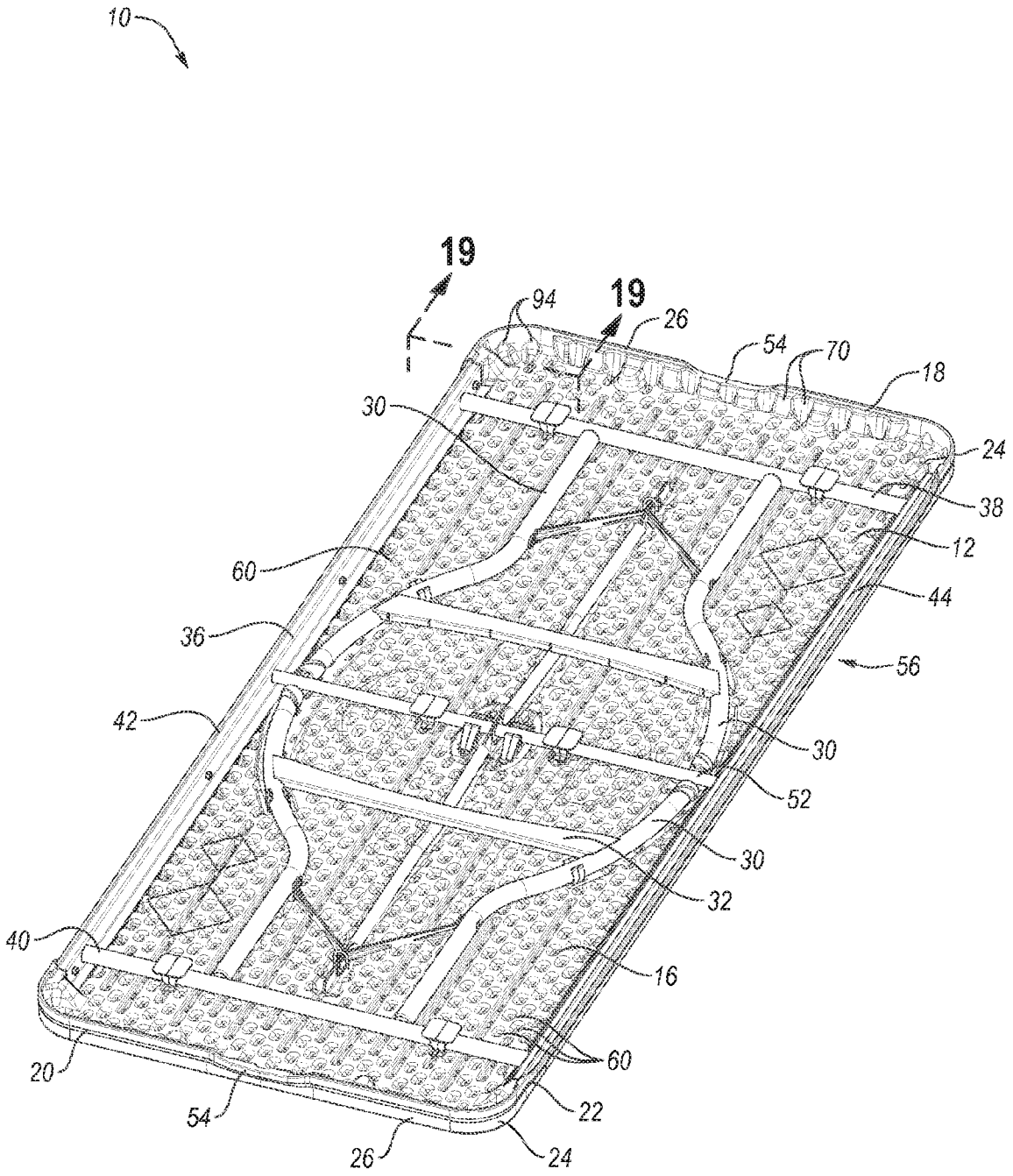
FIG. 15 is another lower perspective view of the table, illustrating the support structures in a collapsed or storage position.

The table 10 is preferably sized and configured to be stacked with one or more additional tables. In particular, the stacked tables 10 are preferably nested together to reduce the height of the stacked tables, which may allow the tables to be shipped, stored and transported in a smaller area. This may result in significant cost savings to the manufacturer, for example, because less storage space may be required and a substantial reduction in transportation costs may be achieved. An exemplary embodiment of stacked and nested tables is shown in FIGS. 13 and 14, which are discussed below in more detail. Additional features, aspects and exemplary embodiments of stacked and nested tables are shown in Assignee's U.S. patent application Ser. No. 13/455,041, entitled TABLES WITH NESTING TABLE TOPS, filed Apr. 24, 2012, now U.S. Pat. No. 8,397,652; U.S. patent application Ser. No. 13/455,055, entitled FRAME FOR A TABLE, filed Apr. 24, 2012, now U.S. Pat. No. 8,408,146; and U.S. patent application Ser. No. 13/455,066, entitled TABLE, filed Apr. 24, 2012, now U.S. Pat. No. 8,347,795. Each of these applications and patents is incorporated by reference in its entirety.

The frame 36 may be sized and configured to facilitate nesting of the tables 10. For example, as shown in FIG. 2, the side rails 42, 44 of the frame 36 may be disposed along the sides 22 of the tabletop 12. Advantageously, if the side rails 42, 44 are disposed proximate the sides 22 of the tabletop 12, then the sides of the tabletop may be supported by the frame 36, which may help create a strong and sturdy table 10. In addition, the side rails 42, 44 may be sized and configured to help transfer forces towards a center portion of the table and away from the perimeter 18, which also help create a strong and sturdy table 10.

As shown in FIGS. 1 to 4, the table 10 may include a handle 54 disposed at one or both ends 26 of the tabletop 12. The handle 54 is preferably sized and configured to facilitate moving and transporting the table 10. In addition, the handle 54 may assist in separating the tables 10 in the nested configuration, The handle 54 may consist of a recess or opening in the lip 20 of the tabletop 12 and the handle may be integrally formed with the tabletop as part of a unitary, one-piece construction.

The table 10 may also include openings 56 disposed in the lip 20 along the sides 22 of the tabletop 12. The openings 56 may be sized and configured to allow a portion of the frame 36, such as an outer surface 58 of the frame, to be visible or exposed along the sides 22 of the tabletop 12. This may allow, for example, a consumer to readily see the exposed surface 58 of the frame 36. Therefore, the tabletop 12 may include openings 56 in the sides 22 to allow a portion of the frame 36 to be exposed and openings in the ends 26 to form the handles 54. Thus, the tabletop 12 may include openings in both the sides 22 and the ends 26, and the openings 56 in the sides may be much larger than the handles 54 by a factor such as five, ten, twenty or more.

As shown in the accompanying figures, the tabletop 12 may include a plurality of depressions 60. The depressions 60 may be sized, shaped, configured and arranged to provide increased strength, stiffness and/or rigidity to the tabletop 12. The depressions 60 may also cover the majority, substantially all or the entire lower portion 16 of the tabletop 12. In addition, the depressions 60 may have a generally uniform shape, size, configuration and arrangement. The depressions 60 may further have an elongated shape that is aligned with an axis and the depressions may be aligned in a series of rows and columns that extend along the length and width of the tabletop 12. Additionally, the depressions 60 in adjacent rows and columns may be offset, and the distance between adjacent depressions in the rows and columns may be generally the same. For example, the distance between adjacent depressions in each row or column may be generally constant or the same. The distance between adjacent rows and columns may also be generally constant or the same.

The depressions 60 may be used to create a tabletop 12 with generally uniform characteristics or qualities. For example, if the depressions 60 are consistently spaced, that may allow an upper surface 62 of the tabletop 12 to be uniformly supported. In addition, if the depressions 60 are separated by a generally constant distance, which may be measured from a center of one depression to a center of an adjacent depression, that may create a tabletop 12 with more uniform characteristics or qualities. The distance between adjacent depressions 60 may be measured longitudinally, laterally or at an angle depending, for example, upon the arrangement of the depressions.

The depressions 60 may also be disposed in a pattern and the depressions may be generally aligned and/or disposed in predetermined locations within the pattern. The pattern may include, for example, a number of rows 64 and/or columns 66 of depressions 60. The rows 64 could be disposed along a length of the tabletop 12 and the columns 66 could extend along a width of the tabletop. The depressions 60 may also be disposed in other suitable forms and patterns, and may have other shapes, sizes, configurations and arrangements, depending, for example, upon the intended use of the table 10.

A plurality of depressions 60 may also be disposed proximate the connection of the frame 36 and tabletop 12. These depressions 60 proximate the frame 36 may have the same size, shape, configuration and arrangement as the depressions in the pattern. The depressions 60 proximate the frame 36 may also have other sizes, shapes, configurations and/or arrangements as discussed in more detail below. A plurality of depressions 60 may also be disposed between the side rails 42, 44 of the frame 36 and an upper surface 62 of the tabletop 12. Advantageously, the depressions 60 may help support the portion of the tabletop 12 disposed above the side rails 42, 44 of the frame 36, which may help prevent the tabletop from undesirably sagging or otherwise deforming. The depressions 60 may also help prevent portions of the tabletop 12 disposed above the side rails 42, 44 of the frame 36 from undesirably bending or collapsing if a load or force is applied to that portion of the tabletop.

The depressions 60 may also have different characteristics depending, for example, upon the particular configuration of the depressions. For example, the depressions 60 may have an elongated length and a depression may have increased strength along its length. The depression 60 may also have a non-circular configuration with increased strength in one direction in comparison to another direction. Advantageously, if the depressions 60 have different characteristics, then the depressions can be arranged or configured so the structure has certain characteristics. In particular, the depressions 60 may be arranged into a pattern to maximize certain characteristics and/or create a structure with generally uniform characteristics. For instance, the pattern may include generally uniformly spaced depressions 60 that are separated by a generally constant distance and/or disposed in standardized arrangement. A consistent arrangement of the depressions 60 may help create a structure with uniform characteristics. For example, a generally constant pattern of depressions 60 may create a structure with generally uniform strength and structural integrity.

The table 10, the tabletop 12, the depressions 60 and other components of the table may have a variety of suitable shapes, sizes, configurations and arrangements, such as disclosed in Assignee's U.S. Pat. No. 7,069,865, entitled HIGH-STRENGTH, LIGHTWEIGHT BLOW-MOLDED PLASTIC STRUCTURES, issued Jul. 4, 2006, which is incorporated by reference in its entirety. In addition, the table 10, the tabletop 12 and the depressions 60 may have other suitable features and configurations, such as disclosed in Assignee's U.S. patent application Ser. No. 11/372,515, entitled HIGH-STRENGTH, LIGHTWEIGHT BLOW-MOLDED PLASTIC STRUCTURES, filed Mar. 9, 2006, currently pending, which is incorporated by reference in its entirety.

The tabletop 12 may also one or more strengthening members 70, which may be disposed proximate the ends 26 of the tabletop. The strengthening members 70 may also be formed in the lip 20, the sides 22 and/or the corners 24 of the tabletop 12. Advantageously, the strengthening members 70 may increase the strength, rigidity, structural integrity and/or impact resistance of the tabletop 12. Additional exemplary tables, tabletops, depressions and strengthening members (along with other features, aspects and components) are disclosed in Assignee's U.S. Pat. Nos, 7,111,563; 7,475,643; 7,814,844 and 8,033,228; which are each incorporated by reference in its entirety. It will be understood the tables disclosed herein may have different shapes, sizes, configurations and arrangements; and may include any suitable number and combination of features, aspects and components; but none of the features, aspects or components may be required.

The tabletop 12 may include strengthening members, such as the depressions 60 and/or the strengthening members 70, disposed at least proximate stress concentrations. For example, strengthening members may be positioned to help strengthen the upper surface 62 and/or a lower surface 68 of the tabletop 12, and minimize stress concentrations, such as may occur at the connection of the frame 36 and tabletop. In particular, strengthening members may be sized and configured to increase the strength, stiffness and/or rigidity of the tabletop 12 disposed above the 36 frame by minimizing unsupported areas of the tabletop. Additionally, strengthening members may increase the strength, stiffness and/or rigidity of portions of the tabletop 12 that extend beyond the frame 36. For instance, strengthening members may be sized and configured to help prevent portions of the tabletop 12 from undesirably bending or twisting, such as the edges that are disposed about the perimeter 18 of the tabletop 12.

As discussed above, strengthening members, such the depressions 60 and/or the strengthening members 70, may have a particular size, shape, configuration and/or arrangement to provide increased strength, rigidity and/or structural integrity. Thus, the strengthening members may have a specific size, shape, configuration and arrangement depending, for example, upon factors such as location, intended use, function and the like.

Figure 5:
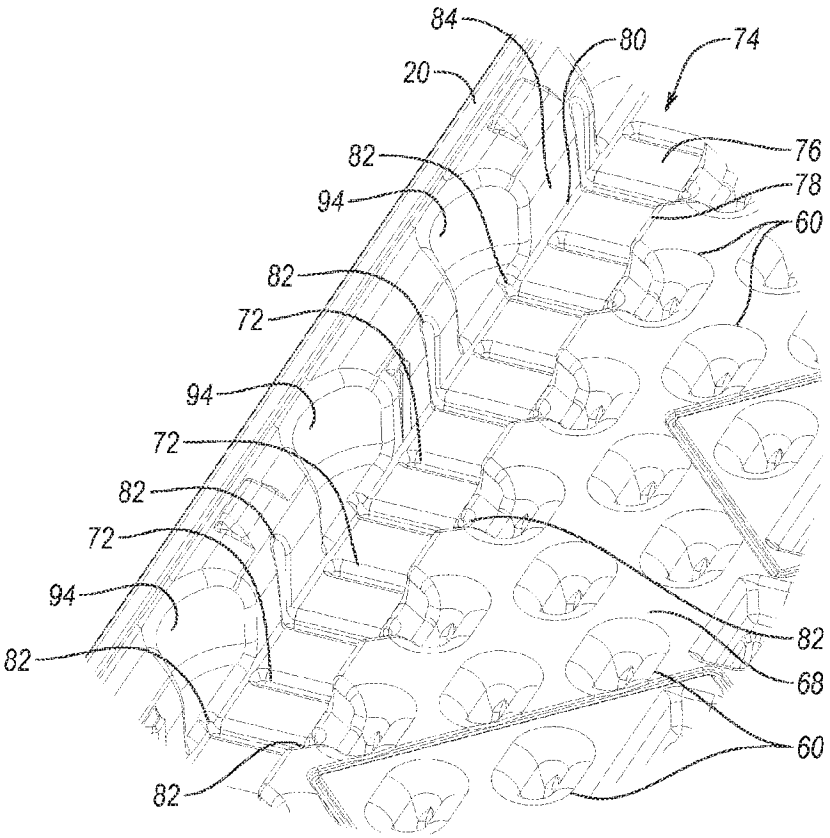
FIG. 5 is an enlarged lower perspective view of a portion of the tabletop designated by broken lines labeled 5 in FIG. 4.

As best seen in FIG. 5, the tabletop may include strengthening members 72 disposed proximate a frame receiving portion 74 sized and configured to receive at least a portion the frame 36. In particular, the frame receiving portion 74 may be sized and configured to receive the side rails 42, 44 of the frame 36. The side rail 42 may contact or abut an upper surface 76 of the frame receiving portion 74. The side rail 42 may also contact or abut an inner sidewall 78 and an outer sidewall 80 of the frame receiving portion 74. The frame receiving portion 74 may be integrally formed in the lower surface 68 of the tabletop 12 as part of a unitary, one-piece construction.

The strengthening members 72 may be sandwiched or disposed between an upper surface of the side rail 42, 44 and the upper surface 62 of the tabletop 12. For instance, the strengthening members 72 may include one end disposed proximate an upper surface of the side rail 42, 44 and an opposing end contacting the upper surface 62 of the tabletop 12. The strengthening members 72 may further be sized and configured to facilitate air flow during the molding process, which may be particularly helpful if the tabletop is constructed from blow-molded plastic because the frame receiving portion 74 may extend inwardly from the lower surface 68 of the tabletop 12 and there may be limited spaced between the upper portion of the frame receiving portion and the upper surface of the tabletop 12.

Figure 7:
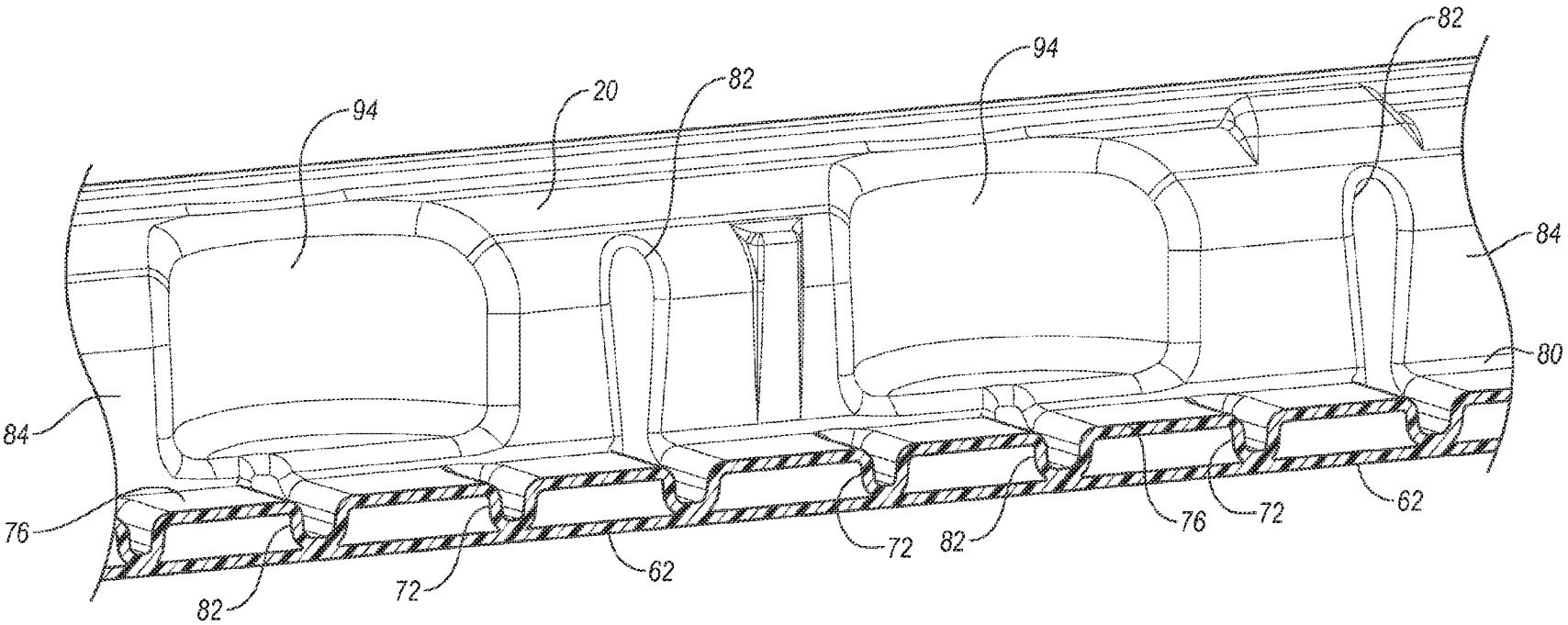
FIG. 7 is an enlarged partial cross-sectional side view along lines 7-7 of a portion of the tabletop shown in FIG. 4.
Figure 8:
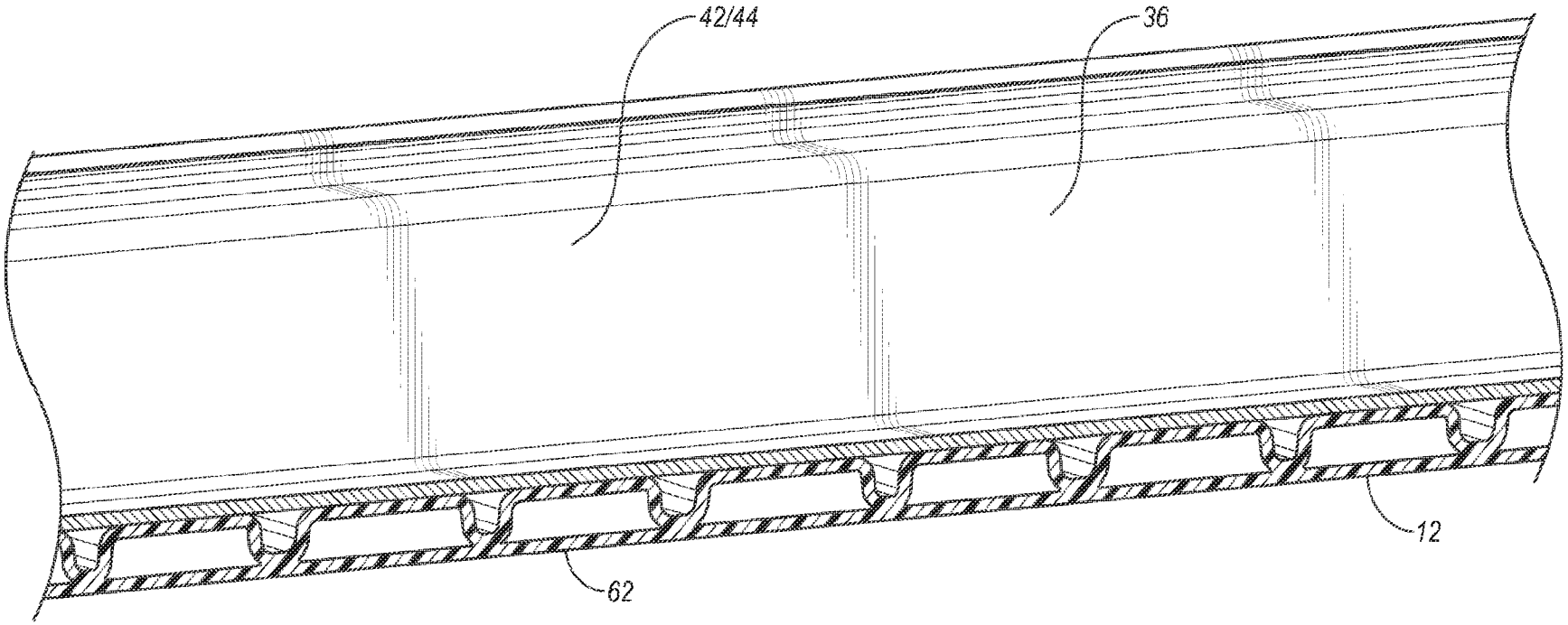
FIG. 8 is an enlarged partial cross-sectional side view along lines 8-8 of a portion of the tabletop shown in FIG. 3.

As seen in FIGS. 5 and 7, the strengthening members 72 may be disposed in the upper surface 76 of the frame receiving portion 74. The strengthening members 72 may extend from the upper surface 76 of the frame receiving portion 74 to the upper surface 62 of the tabletop 12. As shown in the accompanying figures, each of the strengthening members 72 may be a channel or rib that is formed in the upper surface 76 of the frame receiving portion 74 that contacts or abuts the upper surface 62, but the strengthening members may also be grooves, indentations, depressions or the like. The strengthening member 72 may be entirely disposed between or confined within the inner sidewall 78 and the outer sidewall 80 of the frame receiving portion 74. While the strengthening member 72 may have an elongated length as shown in the accompanying figures, the strengthening members may also have other suitable configurations such as round, circular, oval, oblong and the like.

The strengthening members 72 may be sized, shaped, configured and arranged to provide increased strength, stiffness and/or rigidity to the tabletop 12. The strengthening members 72 may also be used to create a tabletop 12 with more uniform characteristics or qualities. Advantageously, the strengthening members 72 may help support the portion of the tabletop 12 disposed above the side rails 42, 44, which may help prevent the tabletop from undesirably sagging or otherwise deforming. The strengthening members 72 may also help prevent the portion of the tabletop 12 disposed above the side rails 42, 44 from bending or collapsing if a load or force is applied to that portion of the tabletop.

As best seen in FIGS. 5 and 7, the tabletop 12 may include a first group or plurality of strengthening members 72, which may be substantially or entirely disposed in the upper surface 76 of the frame receiving portion 74. The strengthening members 72 may have an elongated length that is disposed in a first direction, such as generally perpendicular to the length of the tabletop 12 and located between the inner and outer sidewalls 78, 80 of the frame receiving portion 74. The strengthening members 72 may have a generally constant or consistent spacing, size, shape, configuration and/or arrangement. In addition, the strengthening members 72 may be disposed along an axis and/or in a parallel configuration, and adjacent strengthening members in the frame receiving portion 74 may be separated from one another by a generally constant distance.

The tabletop 12 may also include a second group or plurality of strengthening members 82. The second plurality of strengthening members 82 may have generally the same size, shape, configuration and arrangement. The second plurality of strengthening members 82 may also be separated by a generally consistent distance. As shown in the accompanying figures, the first and second pluralities of strengthening members 72, 82 may have different shapes, sizes configurations and/or arrangements. For example, the strengthening members 72, 82 may be disposed at different angles, such as at right angles with respect to one another, or in different directions. For instance, in this embodiment, if the first plurality of strengthening members 72 is generally aligned with the length of the tabletop 12, then the second plurality of strengthening members 82 may be generally aligned with the width of the tabletop. If desired, the strengthening members 72, 82 may alternate between a strengthening member from the first plurality of strengthening members and a strengthening member from the second plurality of strengthening members.

As shown in FIGS. 5 and 7, the strengthening members 72, 82 may have different configurations. For example, the strengthening member 82 may be a rib or channel that extends across the width of the frame receiving portion 74 and may be at least partially disposed in one or more of the sidewalls 78, 80 of the frame receiving portion. If the frame receiving portion 74 is aligned with the lip 20, the strengthening member 82 may also be formed in the lip, such as in an inner sidewall 84 of the lip. The strengthening member 82 may be disposed perpendicular to the lip 20 or an edge of the tabletop 12, such as the sides 22, and the strengthening members may be disposed in a parallel configuration. The strengthening members 82 may be sized and configured to help prevent bending or twisting of the outer portions of the tabletop 12 that are not supported by the frame 36.

In greater detail, the strengthening member 82 may be formed in the inner sidewall 78 of the frame receiving portion 74 and the strengthening member may extend along all or only a portion of the inner sidewall. The strengthening member 82 may also spans the entire width of the upper surface 76 of the frame receiving portion 74. Additionally, the strengthening member 82 may be formed in the outer sidewall 80 of the frame receiving portion 74 and/or the sidewall 84 of the lip 20.

As best seen in FIG. 5, the strengthening member 82 may have different sizes and configurations. For example, some of the strengthening members 82 may be larger or smaller. Advantageously, because the strengthening members 82 may be disposed in both the frame receiving portion 74 and the lip 20, the strengthening members may help connect the frame receiving portion and the lip. The strengthening members 82 may also provide increased strength, stiffness and/or rigidity to these portions of the tabletop 12. For instance, the strengthening members 82 may increase the strength, stiffness and/or rigidity of the portions of the tabletop 12 that extend or are disposed beyond the frame 36, such as the lip 20. In addition, the strengthening members 82 may be sized and configured to prevent the lip 20 from undesirably bending or twisting.

Figure 9:
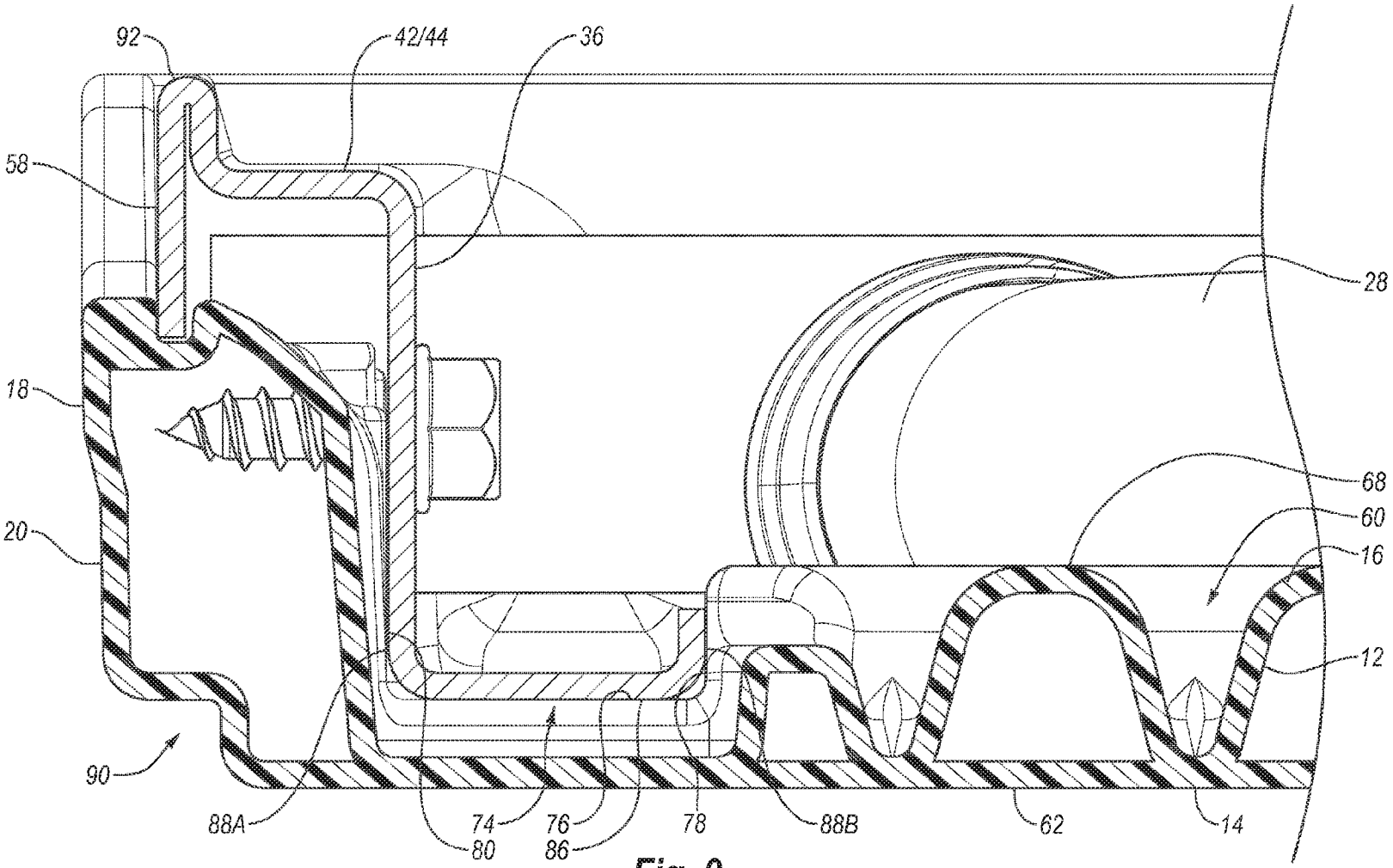
FIG. 9 is an enlarged partial cross-sectional side view along lines 9-9 of a portion of the tabletop shown in FIG. 3.
Figure 10:
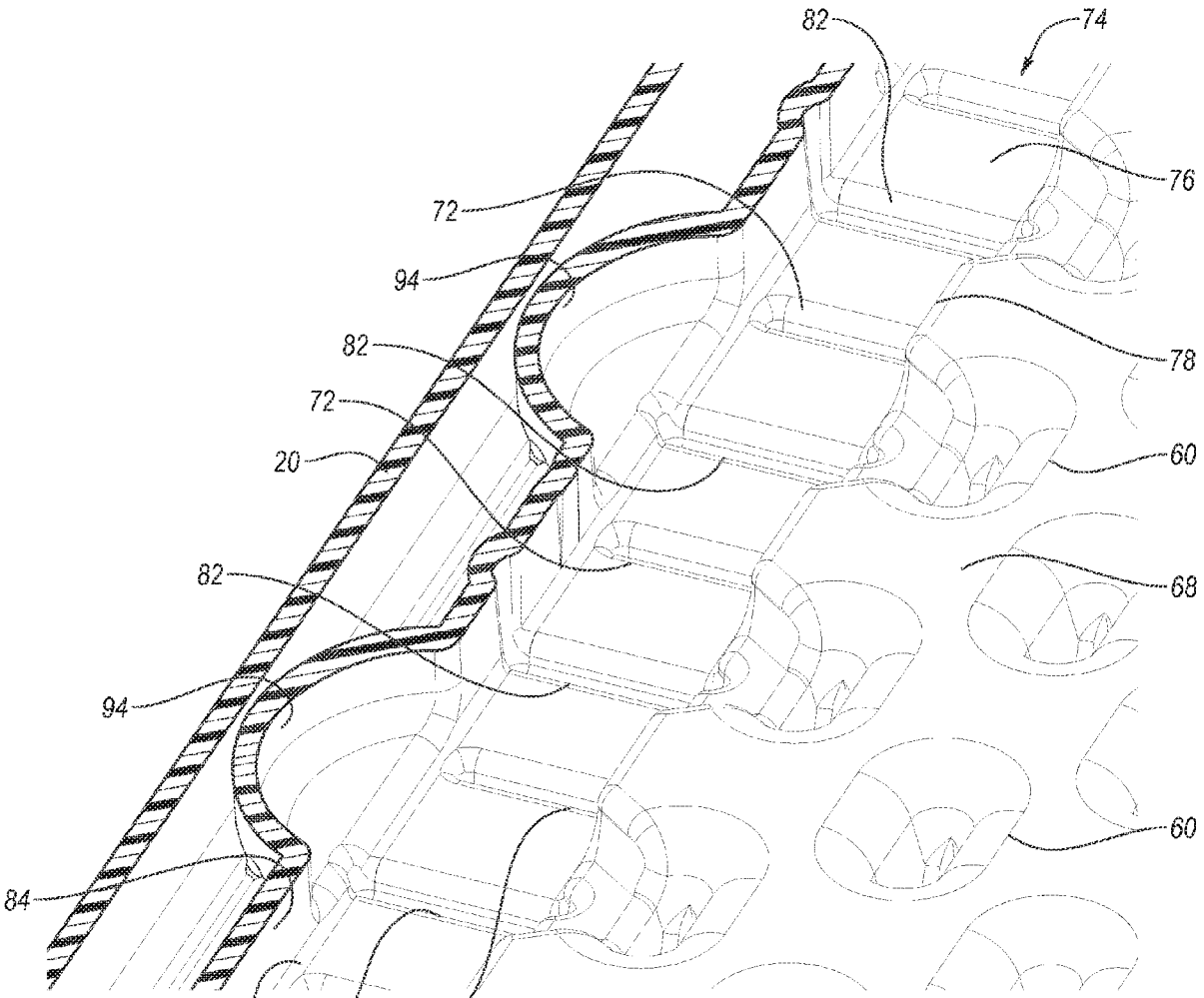
FIG. 10 is an enlarged partial cross-sectional side view along lines 10-10 of a portion of the tabletop shown in FIG. 4.

Therefore, in one exemplary embodiment, a first plurality of depressions or strengthening members 72 and a second plurality of depressions or strengthening members 82 may be disposed between the side rails 42, 44 and the upper portion 14 or upper surface 62 of the tabletop 12. As shown in FIG. 9, the side rails 42, 44 may include an upper portion or surface 86 that contacts the lower surface 68 of the tabletop 12. In addition, the plurality of strengthening members 72 may be disposed between a first side 88A and a second side 88B of the upper portion or surface 86 of the side rails 42, 44.

As discussed above, the depressions 60, the strengthening members 72 and the strengthening members 82 may provide increased strength, rigidity and/or structural integrity. These structures may also support portions of the tabletop 12 such as the portions disposed above the side rails 42, 44 of the frame and portions that extend beyond the frame 36. Advantageously, this may allow the tabletop 12 to have more uniform characteristics.

Figure 11:
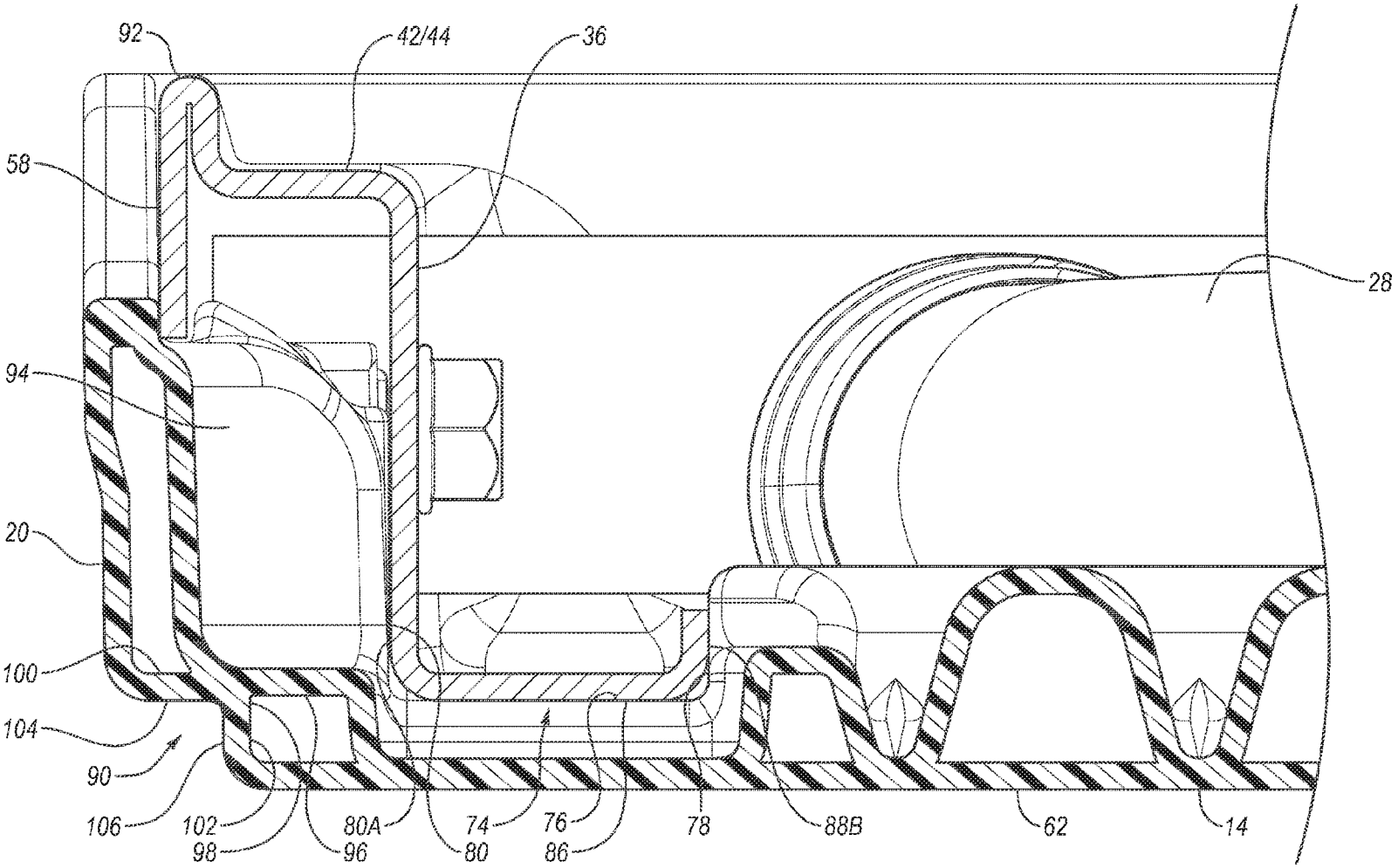
FIG. 11 is an enlarged partial cross-sectional side view along lines 11-11 of a portion of the tabletop shown in FIG. 3.
Figure 12:
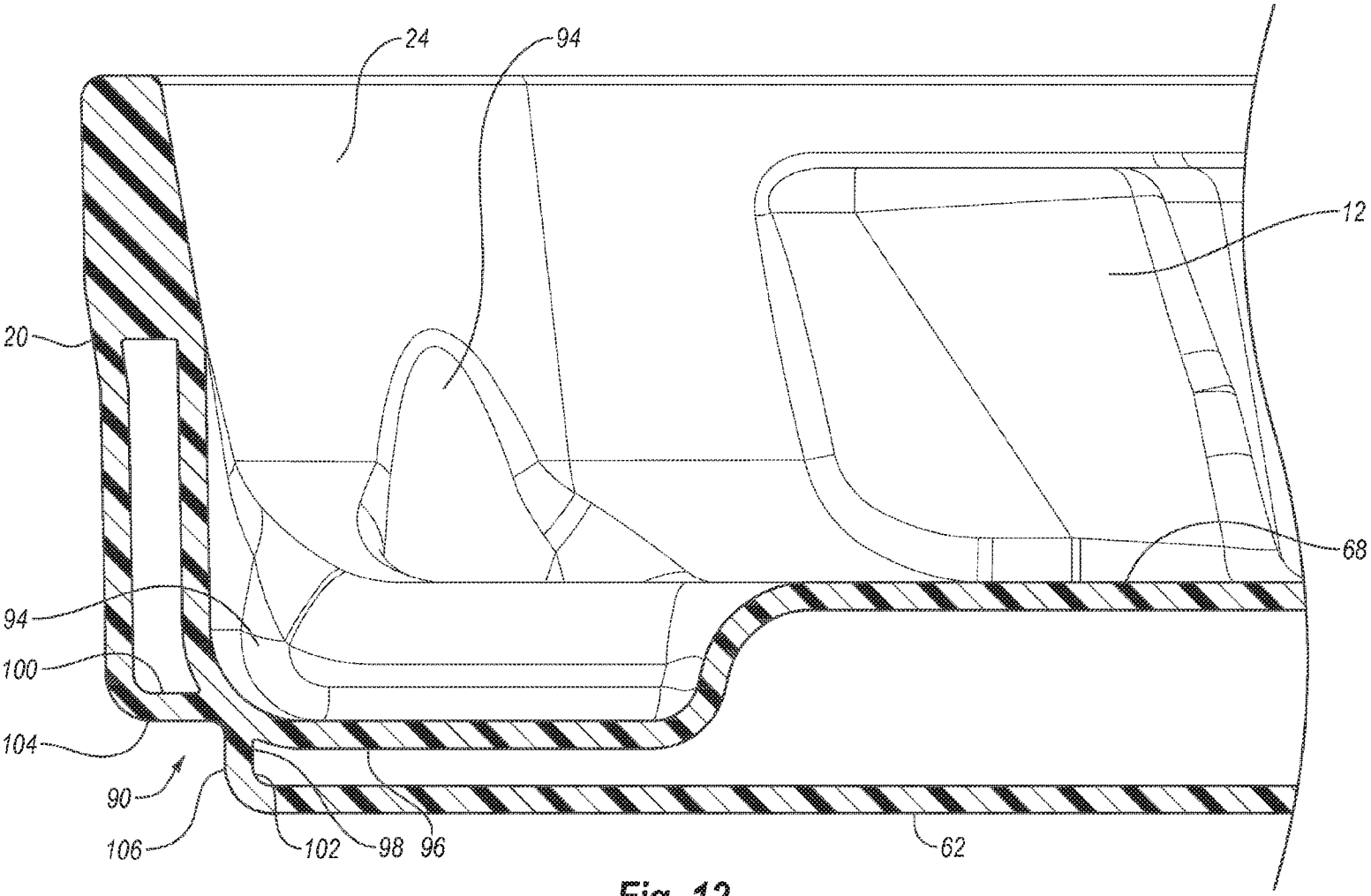
FIG. 12 is an enlarged partial cross-sectional side view along lines 12-12 of a portion of the tabletop shown in FIG. 4.

As shown in FIGS. 9, 11 and 12, the tabletop 12 may include a receiving portion 90 that is sized and configured to facilitate nesting of the tables. The receiving portion 90 may be at least partially disposed in the upper portion 14 or upper surface 62 of the tabletop 12, and may be sized and configured to receive an engaging portion 92 of an adjacent table when the tables are disposed in a nested configuration. The receiving portion 90 is preferably disposed about the perimeter 18 of the tabletop 12. In particular, the receiving portion 90 is preferably disposed about the entire perimeter 18 of the tabletop 12 including the sides 22, the corners 24 and the ends 26. Desirably, the receiving portion 90 may be disposed below a plane aligned with the upper surface 62 of the tabletop 12. The receiving portion 90 may be integrally formed with the tabletop 12 as part of a unitary, one-piece construction during the molding process, if the tabletop is constructed from molded plastic. In greater detail, the receiving portion 90 may be disposed at least proximate the intersection of the upper surface 62 and an outer edge of the tabletop 12. Additionally, the receiving portion 90 may have a generally L-shaped configuration that is open on two sides, which may help facilitate alignment and nesting of the tables 10.

The engaging portion 92 may be a portion of the frame 36, such as a portion of the side rails 42, 44, and/or a portion of the tabletop 12, such as a portion of the lip 20, the sides 22, the corners 24 and/or the ends 26. If desired, the portions of the lip 20, the sides 22, the corners 24 and/or the ends 26 disposed in the receiving portion 90 may include compression edges. Therefore, the engaging portion 92 disposed in the receiving portion 90 may include a combination of one or more portions of the frame 36 and/or tabletop 12. The receiving portion 90 and engaging portion 92 may have various shapes, sizes, configurations and arrangements, such as shown in Assignee's U.S. patent application Ser. No. 13/455,041, entitled TABLES WITH NESTING TABLE TOPS, filed Apr. 24, 2012, now U.S. Pat. No. 8,397,652; U.S. patent application Ser. No. 13/455,055, entitled FRAME FOR A TABLE, filed Apr. 24, 2012, now U.S. Pat. No. 8,408,146; and U.S. patent application Ser. No. 13/455,066, entitled TABLE, filed Apr. 24, 2012, now U.S. Pat. No. 8,347,795. Each of these applications is incorporated by reference in its entirety.

As shown in the accompanying figures, the receiving portion 90 is preferably disposed about the perimeter 18 of the tabletop 12 including the sides 22, the corners 24 and the ends 26. In addition, the receiving portion 90 may be at least partially disposed in the upper surface 62 and edge of the tabletop 12, and the receiving portion may be disposed below a plane generally aligned with the upper surface of the tabletop. The receiving portion 90 may be integrally formed with the tabletop 12 as part of a unitary, one-piece construction during the molding process, if the tabletop is constructed from molded plastic.

As shown in FIG. 14, the receiving portion 90 may have a generally L-shaped configuration that is open on two sides, which may facilitate alignment and nesting of the tables 10. The receiving portion 90 may be a groove or channel with a height and a width. For example, a sidewall 106 of the receiving portion 90 may have a height of between about 0.25 inches and about 0.5 inches, such as about 0.3 inches or 0.4 inches, and a lower surface 106 of the receiving portion 90 may have a width that is greater than the height by a factor such as two, three or more. For example, the width may be approximately two times the height such that, in this exemplary embodiment, if the height is about 0.25 inches, then the width may be about 0.5 inches. The height and the width may also be approximately the same. For instance, if the height is about 0.5 inches, then the width may also be about 0.5 inches. It will be appreciated the width may also be smaller than the height. Thus, for example, if the height is about 0.4 inches, then the width may be about 0.3 inches or less. It will be understood the height and/or the width of the receiving portion 90 may vary depending, for example, upon the intended use of the table 10.

The receiving portion 90 may be supported by strengthening members and/or depressions 94 disposed in the lower portion 16 of the tabletop 12. For example, as shown in FIG. 11, the strengthening members 94 may include an inner portion 96 (such as an upper or inner surface), that contacts, abuts or engages an inner portion 98 (such as an inner surface) of the receiving portion 90. In greater detail, the strengthening members 94 may extend inwardly or horizontally relative to the lower portion 16 of the tabletop 12. For instance, the strengthening members 94 may be disposed along the sides 22 and/or ends 26 of the tabletop 12. In particular, the strengthening members 94 may be disposed in the inner sidewall 84 of the lip 20 and have a generally curved or arc-shaped configuration. An inner surface of the strengthening member 94 may be spaced apart from an outer wall of the lip 20 and the inner portion 96 of the strengthening members may contact the inner portion 98 of the receiving portion 90. For a table 10 that is about six (6) feet in length, thirty-two (32) strengthening members 94 may be disposed along each side 22 of the tabletop 10. It will be understood additional or fewer strengthening members 94 may be disposed along the sides 22 and/or ends 26 of the tabletop 12 depending, for example, upon the length or intended use of the table 10.

As shown in FIGS. 4-7 and 10-11, for example, the strengthening members 94 may be disposed in the sidewall 84 of the lip 20. The strengthening members 94 may also be disposed in the corners 24, such as shown in FIGS. 2 and 12. Advantageously, the strengthening members 94 may also consist of and/or be referred to as depressions. Further, as discussed below, one or more depressions may be used to connect the receiving portion 90 and strengthening members 94. In will be understood, in light of the present disclosure, the strengthening members 94 may have different shapes, sizes, configurations and arrangements depending, for example, upon the intended use of the table 10.

The strengthening members 94 may also be disposed at other angles and/or connected to the inner portion 98 of the receiving portion 90 in different configuration and arrangements. For example, as shown in FIG. 12, the strengthening members 94 may be disposed in the corners 24 of the tabletop 12. The strengthening members 94 in the corners 24 may extend upwardly from the lower surface 68 of the tabletop 12. In greater detail, the inner portion 96 of the strengthening member 94 in the corner 24 may contact, abut or engage the inner portion 98 of the receiving portion 90. In particular, the inner portion 96 of the strengthening members 94 may contact the inner portion 98 of the receiving portion 90, such as inner surface of a lower portion 100 and/or an inner surface the sidewall 102. Each corner 24 of the tabletop 12 may include eight (8) connections between the strengthening members 94 and the receiving portion 90. It will be understood the table 10 may have any appropriate number of connections between the strengthening members 94 and the receiving portion 90, the strengthening members may be disposed in any suitable portions of the tabletop 12 and the strengthening members may have other sizes, shapes, configurations and arrangements depending, for example, upon the intended use of the table 10.

Advantageously, the strengthening members 94 may provide increased strength, support, rigidity and structural integrity for the receiving portion 90. The strengthening members 94 may also allow the receiving portion 90 to support a considerable amount of weight or force. Significantly, this may allow a number of tables 10 to be disposed in a nested configuration because, for example, the tables disposed in the bottom of the stack may not be damaged by the weight of the tables. For instance, when the tables 10 are nested together as shown in FIGS. 13 and 14, the engaging portion 92 may contact or abut the lower surface 104 and/or the sidewall 106 of the receiving portion 90 and these may become load bearing surfaces. Because the strengthening members 94 may increase the strength, rigidity and/or structural integrity of the receiving portion 90, this may allow a considerable number of tables 10 to be stacked and nested together without damage to the receiving portion.

One or more depressions may also support the receiving portion 90. For example, one or more depressions may connect the strengthening member 94 and the receiving portion 90. In addition, one or more depressions may be formed in the lip 20 and/or the lower portion 14 of the tabletop 12, and the depressions may contact, engage or abut the inner portion 98 of the receiving portion 90.

Figure 16:
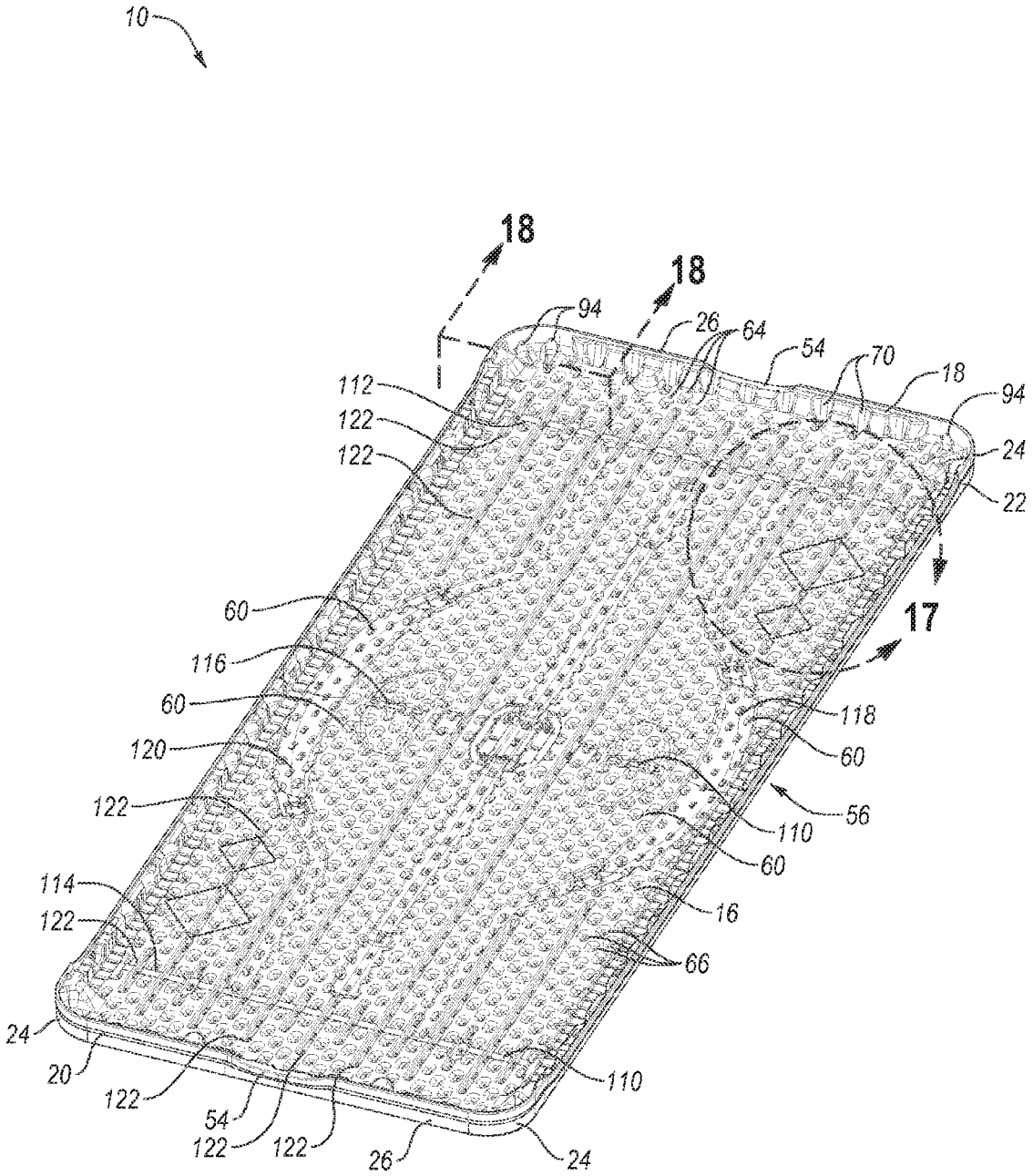
FIG. 16 is still another lower perspective view of a portion of the table, illustrating the tabletop.
Figure 17:
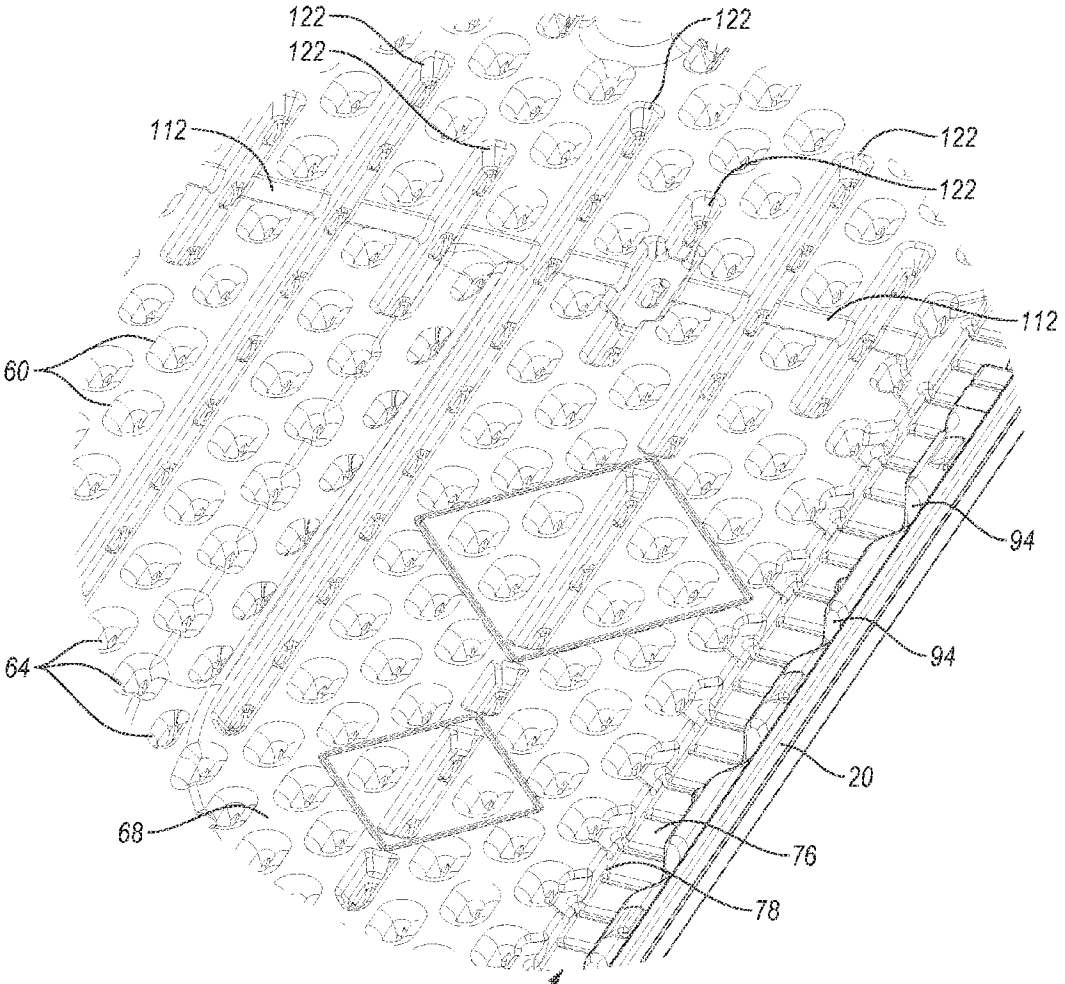
FIG. 17 is an enlarged lower perspective view a portion of the tabletop designated by broken lines labeled 17 in FIG. 16.

The table 10 may also include other structures that may increase the strength, rigidity and/or structural integrity of the tabletop 12. For example, the lower surface 68 of the tabletop 12 may include one or more recesses 110 that are sized and configured to receive a structural support member such as a portion of the support structure 28, the frame 36, the cross member 38, the cross member 40 and/or the cross member 52. For instance, as shown in FIG. 16, a first cross member recess 112 may be sized and configured to receive a portion of the cross member 38 and a second cross member recess 114 may be sized and configured to receive a portion of the cross member 40. A third cross member recess 116 may be sized and configured to receive the cross member 52 disposed proximate the center of the tabletop 12. The lower surface 68 of the tabletop 12 may also include a first support structure recess 118 and a second support structure recess 120 that are sized and configured to receive the support structures 28 in the collapsed or storage position. The recesses 112, 114, 116, 118 and 120 may facilitate nesting of the tables 10 by allowing an upper portion of an adjacent stacked table to be disposed in a lower portion of the table. The recesses 112, 114, 116, 118 and 120 may also help position the various components in the desired positions.

The lower surface 68 of the tabletop 12 may also include one or more channels 122, which may be aligned in a parallel configuration. The channels 122 may have a width generally equal to the width of the depressions 60 in the lower surface 68 and the channels are preferably aligned with the depressions. Advantageously, because the channels 122 may be aligned with and have generally the same width as the depressions 60, the channels may not disrupt or interfere with a pattern or arrangement of generally uniformly disposed depressions. The channels 122, however, may have a width that is larger or smaller than the width of the depressions 60, if desired.

As shown in FIGS. 15-19, a plurality of depressions 124 may be disposed in a lower portion 126 of the channels 122 and the depressions may contact, abut or engage the upper surface 62 of the tabletop 12. The depressions 124 may have the same general pattern, spacing, size, shape, configuration and arrangement. In addition, the depressions 124 in the lower portion 126 of the channel 122 may be disposed in generally the same pattern as the depressions 60 in the lower surface 68. Significantly, if the depressions 60, 124 are disposed in generally the same pattern, this may create a tabletop 12 with generally uniform characteristics such as strength, rigidity and structural integrity.

The channels 122 may have a variety of different lengths. For example, some of the channels 122 may have a length that only allows a limited number of depressions 124, such as three (3), to be disposed in the lower portion 126. Other channels 122 may have a longer length that allows a great number of depressions 124 to be disposed in the lower portion 126, such as ten (10) or twelve (12). Further, other channels 122 may extend from one end to the other end of the tabletop 12. It will be appreciated that the channels 122 may have any suitable length.

The channels 122 may be sized, shaped, configured and/or arranged to increase the strength, rigidity, structural integrity and/or torsion resistance of the tabletop 12. For example, the channels 122 may have opposing walls 128, 130 and the opposing walls may increase the strength, rigidity, structural integrity and/or torsion resistance of the tabletop 12. The lower portion 126 of the channel may also be spaced proximate the upper surface 62 and that may increase the strength, rigidity, structural integrity and/or torsion resistance of the tabletop 10.

The channels 122 are preferably disposed on both sides of a structural support member such as the cross members 38, 40. In particular, the channels 122 preferably extend through a cross member recess, such as the first and second cross member recesses 112, 114, and past both sides of the cross member recess. In addition, a depression may be disposed at an intersection of one or more of the channels 122 and the recess for the cross member. Additionally, the ends of the channels 122 are preferably disposed proximate a portion of the tabletop 12 that is not directly supported by the frame 36. For example, the ends of the channels 122 may be disposed proximate the ends 26 of the tabletop 12, which may extend beyond the ends of the side rails 42, 44 and the cross members 38, 40. In particular, a first end of each channel 122 of the plurality of channels may be disposed proximate a first end of the tabletop, and the ends of the channels may be generally spaced an equal distance from the first end of the tabletop. The channels 122 may also have different lengths.

Advantageously, the channels 122 and the depressions 124 may increase the strength, stiffness, rigidity and/or structural integrity proximate the structural support members and accompanying recesses, and the ends 26 of the tabletop 12. Significantly, this may prevent the ends 26 of the tabletop 12 from rotating or moving downwardly relative to the cross member 38, 40 and/or ends of the frame 36, which may increase the torsion resistance of the tabletop 12.

Figure 18:
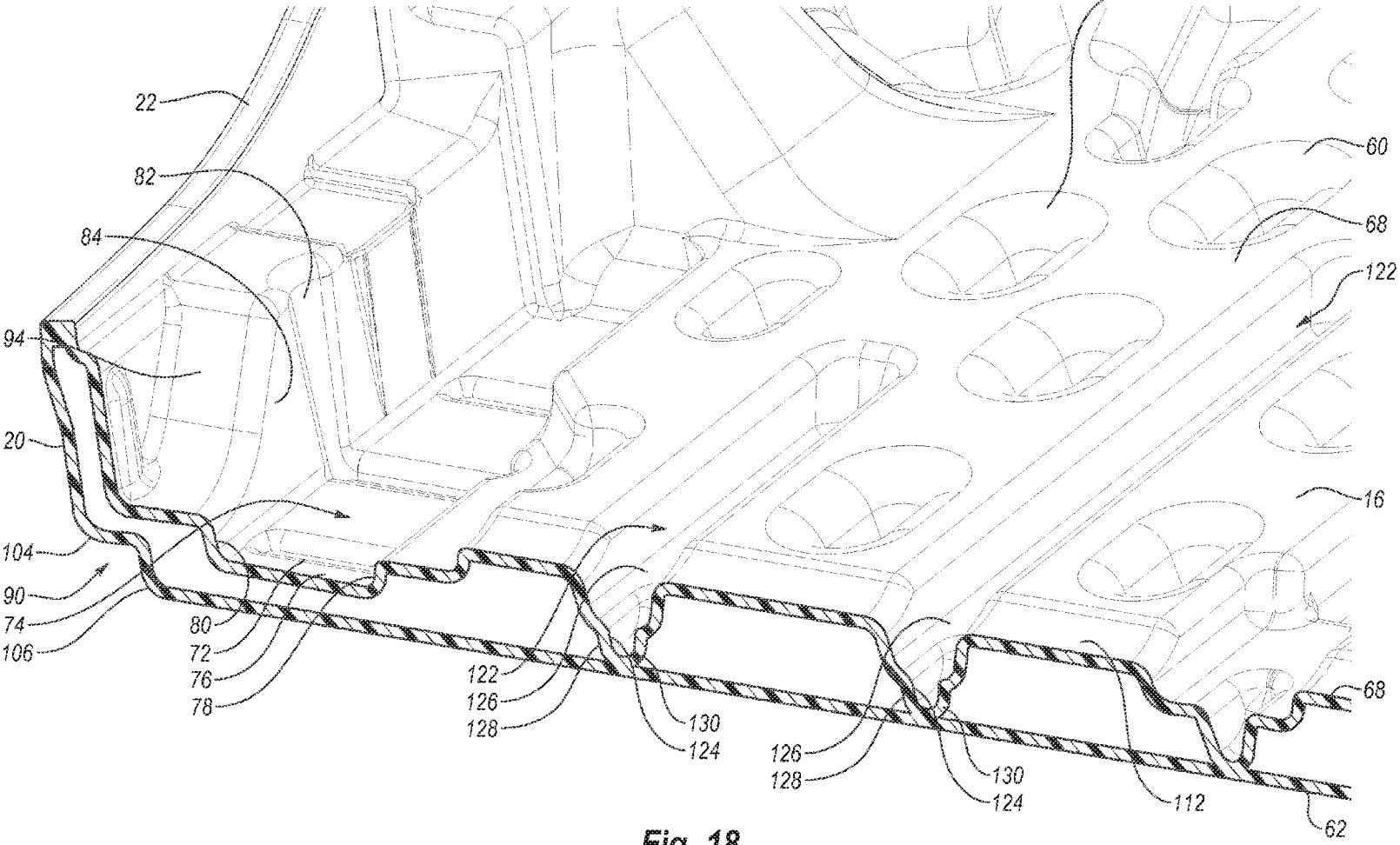
FIG. 18 is an enlarged cross-sectional perspective view along lines 18-18 of a portion of the tabletop shown in FIG. 16.
Figure 19:
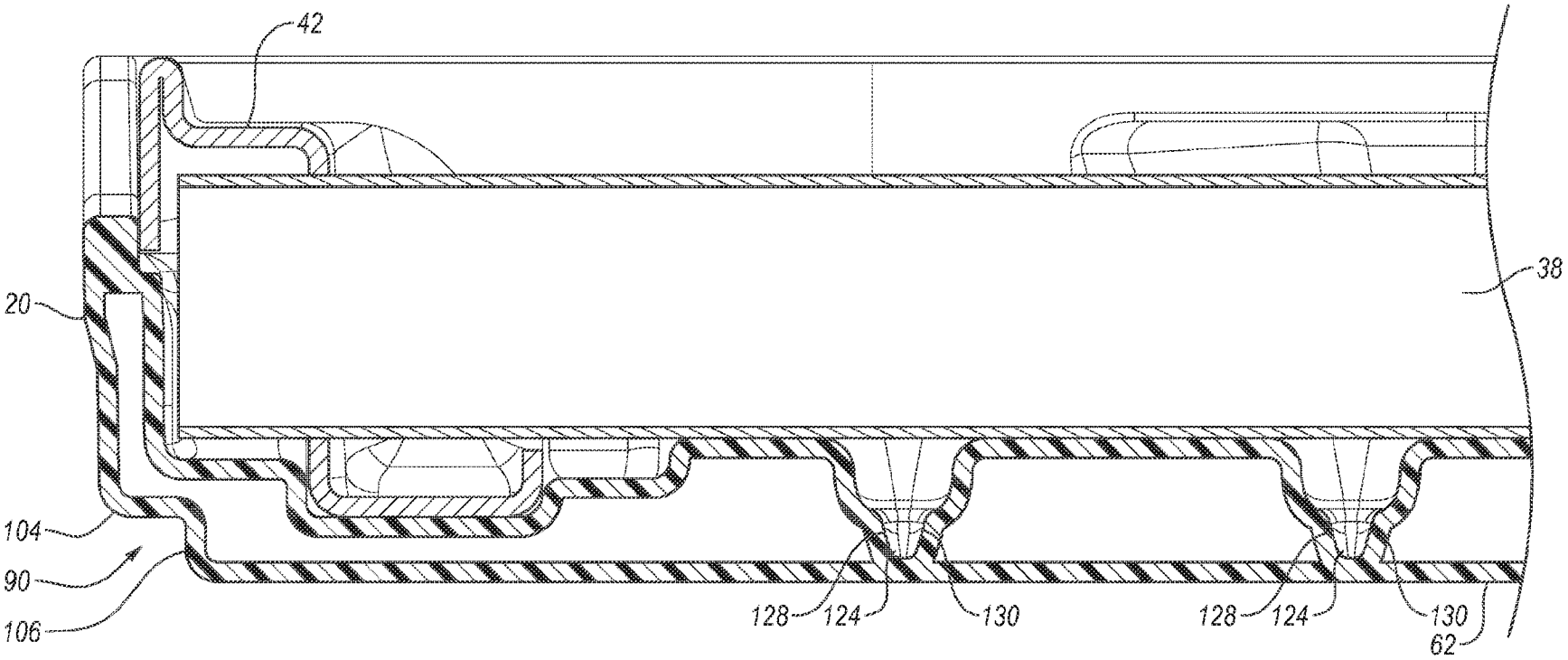
FIG. 19 is an enlarged partial cross-sectional side view along lines 19-19 of a portion of the tabletop shown in FIG. 15.

As seen in FIGS. 18 and 19, the lower surface 68 may be spaced a generally constant distance apart from the upper surface 62 so that the tabletop 12 has a generally constant height or thickness. The various structures disposed in the lower surface 68 in the tabletop 12 may have different heights. For example, the cross member recesses 112, 114, 116 may have a height that is slightly less than the thickness of the tabletop 12. The frame receiving portion 74 may have a height that is smaller than the thickness of the tabletop 12 and the height of the cross member recess 112. The lower portion 126 of the channel 122 may also have a height that is smaller than the thickness of the tabletop 12 and the height of the cross member recess 112. As shown in the accompanying figures, the height of the frame receiving portion 74 and the channel 122 may be approximately the same. Thus, the height of the cross member recesses 112, 114, 116 may be between the height of the frame receiving portion 74 and the channel 122. Because the height of the frame receiving portion 74 and the channel 122 may be about the same, and because the frame receiving portion may include the strengthening members 72, 82 and the channel may include the depressions 124, the upper surface 62 of the tabletop 12 may have generally similar characteristics such as strength, rigidity and structural integrity.

In this exemplary configuration, the upper surface 62 of the tabletop 12 may be generally uniformly supported, which may allow the tabletop to have generally consistent characteristics and qualities such as strength, rigidity, structural integrity and smoothness of the upper surface. It will be appreciated that the table 10 and table top 12 may also have other suitable features, aspects, configurations and the like, such as disclosed in Assignee's U.S. patent application Ser. No. 13/455,073, entitled TABLE WITH MOLDED PLASTIC TABLE TOP, filed Apr. 24, 2012, now U.S. Pat. No. 8,622,007; and U.S. patent application Ser. No. 13/455,081, entitled TABLE TOP, filed Apr. 24, 2012, now abandoned. Each of these patents and applications is incorporated by reference in its entirety.

One of ordinary skill in the art may appreciate after reviewing this disclosure that the tables disclosed herein may have a number of different aspects, features, characteristics and configurations. Further, a table may have any suitable number of aspects, features, characteristics and configurations depending, for example, upon the intended use of the table.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A tabletop comprising:

an upper portion;

a lower portion;

a sidewall;

a receiving portion at least partially formed in the upper portion of the tabletop and the sidewall of the table top, *the receiving portion extending about an entire outer perimeter of the upper portion of the tabletop,* at least a portion of the receiving portion extending downwardly from the upper portion of the [table top] *tabletop* and inwardly from the sidewall of the table top, *the receiving portion including an inner surface,* the receiving portion comprising:

a first wall disposed at an angle relative to the upper portion of the table top; and a second wall disposed at an angle relative to the lower portion of the table top;

a hollow interior portion at least partially defined by the upper portion[,] *and* the lower portion[, and the sidewall] of the [table top] *tabletop*; and at least one receiving portion strengthening member contacting *the inner surface of* the receiving portion to support the first wall and the second wall of the receiving portion, *the at least one receiving portion strengthening member at least partially formed by a portion of the lower portion of the tabletop,* the *at least one* receiving portion strengthening member [contacting an inner surface of the receiving portion to provide additional strength and] *providing additional* support for the receiving portion[, the receiving portion strengthening member at least partially disposed in the hollow interior portion;

wherein the receiving portion extends about an entire outer perimeter of the tipper portion of the table top].

2. The tabletop as in claim 1, wherein the upper portion, the lower portion, the sidewall, the receiving portion, and the receiving portion strengthening member are constructed from molded plastic and are integrally formed during a molding process as part of a unitary, one-piece construction.

3. The tabletop as in claim 1, wherein the tabletop *is* sized and configured to nest with an adjacent table in a nested configuration in order to reduce a height of a plurality of tables in a nested configuration, each of the tables in the nested configuration having substantially the same size and shape; and wherein the receiving portion *is* sized and configured to receive an engaging portion of an adjacent table when the tables are disposed in a nested configuration to reduce the height of the tables in a nested configuration.

4. The tabletop as in claim 1, wherein the sidewall forms a portion of a lip that extends downwardly relative to the upper portion of the tabletop; *and* wherein the receiving portion strengthening member is *at least partially* disposed in [the] *an* inner surface of the lip and [extending] *at least partially extends* towards [the] *an* outer surface of the lip[; and wherein the receiving portion strengthening member is spaced apart from the outer surface of the lip by a gap].

5. The tabletop as in claim 1, wherein the receiving portion strengthening member contacts the *inner surface of the* receiving portion to support the first wall and the second wall of the receiving portion.

6. The tabletop as in claim 1, further comprising an engaging portion extending downwardly from the upper portion of the tabletop.

[7. The tabletop as in claim 6, wherein the upper portion, the lower portion, the sidewall, the engaging portion, the receiving portion, and the receiving portion strengthening member are constructed from molded plastic and are integrally formed during a molding process as part of a unitary, one-piece construction.]

8. The tabletop as in claim 1, wherein at least one receiving portion strengthening member contacts the receiving portion at least proximate an intersection of the first wall and the second wall of the receiving portion.

9. The tabletop as in claim 1, wherein the receiving portion is disposed between a plane generally aligned with the upper portion of the tabletop and a plane generally aligned with a lower portion of the tabletop; and wherein the receiving portion strengthening member is disposed between the plane generally aligned with the upper portion of the tabletop and the plane generally aligned with the lower portion of the tabletop.

10. The tabletop as in claim 1, wherein [the] *one or more of the at least one* receiving portion strengthening member extends inwardly from the lower portion of the tabletop and *an inner surface of the receiving portion* contacts an inner surface of the second wall of the receiving portion.

11. The tabletop as in claim 1, wherein an inner portion of [the] *one or more of the at least one* receiving portion strengthening member contacts an inner surface of the second wall of the receiving portion; and wherein the receiving portion strengthening member allows the receiving portion to be a load bearing surface for an engaging portion of an adjacent table when the [table top] *tabletop* is disposed in a nested configuration with one or more table tops.

12. The tabletop as in claim 1, wherein [the] *one or more of the at least one receiving portion* strengthening member extends upwardly from the lower portion of the tabletop and contacts an inner surface of the second wall of the receiving portion.

13. A tabletop sized and configured to nest with an adjacent table in a nested configuration in order to reduce a height of a plurality of tables in a nested configuration, the tabletop comprising:

an upper portion;

a sidewall extending downwardly relative to the upper portion;

a receiving portion at least partially disposed in the upper surface and the sidewall, the receiving portion sized and configured to receive an engaging portion of an adjacent table when the tables are disposed in a nested configuration to reduce a height of the tables in a nested configuration, the receiving portion disposed about an entire outer perimeter of the upper portion of the tabletop, *the receiving portion including an inner surface,* the receiving portion comprising:

a first wall with an outer surface sized and configured to be disposed at least proximate the engaging portion of an adjacent table when the tables are disposed in the nested configuration; and a second wall with an outer surface sized and configured to be disposed at least proximate the engaging portion of an adjacent table when the tables are disposed in the nested configuration;

a lip extending downwardly relative to the upper portion of the tabletop; and a plurality of receiving portion strengthening members contacting [and supporting] *the inner surface of* the receiving portion, *the receiving portion strengthening members at least partially formed by a lower portion of the tabletop, at least a portion of* the receiving portion strengthening members spaced apart from an outer portion of the lip by a distance, the receiving portion strengthening members comprising:

a first plurality of strengthening members contacting [an inner surface] *at least a portion* of the first wall of the receiving portion, each strengthening member of the first plurality of strengthening members sized and configured to support the first wall of the receiving portion; and a second plurality of strengthening members contacting [an inner surface] *at least a portion* of the second wall of the receiving portion, each strengthening member of the second plurality of strengthening members sized and configured to support the second wall of the receiving portion.

14. The tabletop as in claim 13, wherein the receiving portion strengthening members are at least partially disposed in the lip.

15. The tabletop as in claim 13, wherein the first plurality of strengthening members extend inwardly relative to a sidewall of [a] *the* lip of the tabletop[; and wherein an inner portion of the first plurality of strengthening members contacts the inner portion of the first wall of the receiving portion].

16. The tabletop as in claim 13, wherein the second plurality of strengthening members extend upwardly relative to the upper portion of the tabletop[; and wherein an inner portion of the second plurality of strengthening members contacts the inner portion of the second wall of the receiving portion].

17. The tabletop as in claim 13, wherein the first plurality of strengthening members are disposed generally parallel to a lower portion of the tabletop; and wherein the second plurality of strengthening members are disposed generally perpendicular to the lower portion of the tabletop.

18. The tabletop as in claim 13, wherein the first plurality of strengthening members allow the first wall of the receiving portion to be a load bearing surface that contacts an engaging portion of a nested table when a plurality of tables are in a nested configuration.

19. The tabletop as in claim 13, further comprising a plurality of depressions disposed in a lower portion of the tabletop; and wherein one or more depressions of the plurality of depressions are disposed in a lip of the tabletop and an end of the depressions contacts the inner portion of the receiving portion.

20. The tabletop as in claim 19, wherein the plurality of depressions are disposed along one or more sides, one or more corners and one or more ends of the tabletop; and wherein the depressions are sized and configured to support the receiving portion in the sides, the corners and the ends of the tabletop.

*21. A tabletop comprising:*

*an upper portion at least partially formed by an upper wall;*

*a lower portion at least partially formed by a lower wall;*

*a sidewall that forms at least a portion of a lip that extends downwardly relative to the upper portion of the tabletop;*

*a hollow interior portion at least partially disposed between the upper wall and the lower wall of the tabletop;*

*a receiving portion at least partially formed in the upper portion of the tabletop, the receiving portion including an inner surface, the receiving portion extending about an entire outer perimeter of the upper portion of the tabletop; and*

*at least one strengthening member at least partially formed by the lower wall of the tabletop, an inner surface of the at least strengthening member contacting the inner surface of the receiving portion to provide additional support for the receiving portion.*

*22. The tabletop of claim 21, wherein at least a portion of the at least one strengthening member is spaced apart from the outer surface of the lip by a gap.*

*23. The tabletop of claim 21, wherein the at least one strengthening member is at least partially formed in an inner portion of the lip.*

*24. A tabletop comprising:*

*an upper wall;*

*a lower wall;*

*a sidewall;*

*a hollow interior portion at least partially disposed between the upper wall and the lower wall;*

*a receiving portion at least partially disposed in the upper wall and the sidewall of the tabletop, the receiving portion including an inner surface, the receiving portion extending about an entire outer perimeter of the upper portion of the tabletop; and*

*at least one strengthening member at least partially disposed in the lower wall of the tabletop, an inner surface of the at least one strengthening member contacting the inner surface of the receiving portion to provide additional support for the receiving portion.*

*25. The tabletop of claim 24, wherein at least a portion of the at least one strengthening member is at least partially formed in an inner portion of a lip.*

*26. The tabletop of claim 24, wherein at least a portion of the at least one strengthening member extends upwardly from the lower wall; and*

*wherein at least a portion of the at least one strengthening member extends towards the sidewall.*

* * * * *